US010017981B2

(12) United States Patent
Hasegawa et al.

(10) Patent No.: US 10,017,981 B2
(45) Date of Patent: *Jul. 10, 2018

(54) MULTIPLE PANE

(71) Applicant: PANASONIC INTELLECTUAL PROPERTY MANAGEMENT CO., LTD., Osaka-shi (JP)

(72) Inventors: Kenji Hasegawa, Osaka (JP); Eiichi Uriu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 297 days.

This patent is subject to a terminal disclaimer.

(21) Appl. No.: 14/463,927

(22) Filed: Aug. 20, 2014

(65) Prior Publication Data
US 2014/0356558 A1  Dec. 4, 2014

Related U.S. Application Data

(63) Continuation of application No. PCT/JP2013/001470, filed on Mar. 7, 2013.

(30) Foreign Application Priority Data

Mar. 7, 2012  (JP) .................. 2012-050052
May 22, 2012  (JP) .................. 2012-116196

(51) Int. Cl.
*E06B 3/66* (2006.01)
*E06B 3/663* (2006.01)

(52) U.S. Cl.
CPC .............. *E06B 3/66* (2013.01); *E06B 3/663* (2013.01); *E06B 3/6612* (2013.01);
(Continued)

(58) Field of Classification Search
CPC ...... E06B 3/66; E06B 3/6612; E06B 3/66304; Y02B 80/24
See application file for complete search history.

(56) References Cited

U.S. PATENT DOCUMENTS 2,025,716 A * 12/1935 Black ............... E06B 3/66333
                                                       428/34
4,853,264 A *  8/1989 Vincent ............... E06B 3/66
                                                       156/102
(Continued)

FOREIGN PATENT DOCUMENTS

CN  1194631  9/1998
JP  2-53945  4/1990
(Continued)

OTHER PUBLICATIONS

WO 2012/081766, Jun. 2012.*
(Continued)

*Primary Examiner* — Donald J Loney
(74) *Attorney, Agent, or Firm* — Greenblum & Bernstein, P.L.C.

(57) ABSTRACT

The multiple pane according to the present disclosure includes: a pair of glass panels; a plurality of spacers interposed between the pair of glass panels; and a hermetic bond to hermetically bond peripheries of the pair of glass panels to each other. The multiple pane contains a space formed between the pair of glass panels, the space being to be sealed so as to be in a reduced pressure state. Each of the plurality of spacers is a porous member.

1 Claim, 13 Drawing Sheets

(52) U.S. Cl.
CPC ...... *E06B 3/66304* (2013.01); *E06B 3/66333* (2013.01); *Y02B 80/24* (2013.01)

(56) References Cited

U.S. PATENT DOCUMENTS

| | | | |
|---|---|---|---|
| 5,302,425 A * | 4/1994 | Taylor | E06B 3/66319 428/137 |
| 5,683,764 A | 11/1997 | Alts | |
| 5,989,659 A | 11/1999 | Kato et al. | |
| 6,291,036 B1 * | 9/2001 | Wang | C03B 27/00 156/107 |
| 6,352,749 B1 * | 3/2002 | Aggas | E06B 3/6612 428/34 |
| 6,479,112 B1 | 11/2002 | Shukuri et al. | |
| 6,497,931 B1 * | 12/2002 | Aggas | E06B 3/6612 428/34 |
| 6,537,121 B1 | 3/2003 | Baret | |
| 9,453,361 B2 | 9/2016 | Montgermont et al. | |
| 9,670,712 B2 * | 6/2017 | Hasegawa | E06B 3/66 |
| 2002/0046797 A1 | 4/2002 | Collins | |
| 2002/0110653 A1 | 8/2002 | Shukuri et al. | |
| 2004/0035086 A1 | 2/2004 | Minaai et al. | |
| 2004/0081775 A1 | 4/2004 | Martin et al. | |
| 2009/0324858 A1 | 12/2009 | Jaeger | |
| 2013/0039059 A1 | 2/2013 | Montgermont et al. | |
| 2013/0273296 A1 * | 10/2013 | Jeon | C03B 23/245 428/69 |
| 2014/0335291 A1 | 11/2014 | Hasegawa et al. | |
| 2014/0356558 A1 | 12/2014 | Hasegawa et al. | |

FOREIGN PATENT DOCUMENTS

| | | |
|---|---|---|
| JP | 05-501896 | 4/1993 |
| JP | 5-501896 | 4/1993 |
| JP | 07-508967 | 10/1995 |
| JP | 11-111165 | 4/1999 |
| JP | H11-278877 A | 10/1999 |
| JP | 11-314944 | 11/1999 |
| JP | 11-315668 | 11/1999 |
| JP | 11-324509 | 11/1999 |
| JP | 2000-063157 | 2/2000 |
| JP | 2000-086304 | 3/2000 |
| JP | 2000-086307 | 3/2000 |
| JP | 2000-149782 | 5/2000 |
| JP | 2001-028240 | 1/2001 |
| JP | 2003-502262 | 1/2003 |
| JP | 2004-529052 | 9/2004 |
| JP | 2005-215134 | 8/2005 |
| JP | 2007-078870 | 3/2007 |
| JP | 2009-102182 | 5/2009 |
| JP | 2010-513197 | 4/2010 |
| WO | 91/02878 | 3/1991 |
| WO | 00/77336 | 12/2000 |
| WO | 2005/073809 | 8/2005 |
| WO | 2011/092421 A1 | 8/2011 |
| WO | 2013/132867 | 9/2013 |

OTHER PUBLICATIONS

Search report from PCT/JP2013/001470, dated May 14, 2013.
Office Action issued in U.S. Appl. No. 14/338,753, dated Sep. 13, 2016.
English translation of Office Action issued in China Counterpart Patent Appl. No. 201380006703.9, dated May 10, 2016.
Industrial Technology in Japan Ten Years Later, Institute of Science and Technical Information of China. Sep. 1963, p. 124, lines 20-22 with English translation of p. 124, lines 20-22.
Search Report issued by I.S.A. in International Patent Application No. PCT/JP2013/001468, dated May 14, 2013, along with an English translation thereof.
Search Report issued by I.S.A. in International Patent Application No. PCT/JP2013/001471, dated Jun. 18, 2013, along with an English translation thereof.
Office Action issued in China Counterpart Patent Appl. No. 201380010832.5, dated Jul. 29, 2016, along with an English translation thereof.

* cited by examiner ent 2, respectively;
MULTIPLE PANE

This application is a U.S. continuation application of PCT International Patent Application Number PCT/JP2013/001470, filed on Mar. 7, 2013, claiming the benefits of priority of Japanese Patent Application Number 2012-050052, filed on Mar. 7, 2012 and priority of Japanese Patent Application Number 2012-116196, filed on May 22, 2012, the entire contents of which are hereby incorporated by reference.

TECHNICAL FIELD

The present disclosure relates to multiple panes each including a pair of glass panels stacked and a low-pressure space between the pair of glass panels.

BACKGROUND ART

There has been commercialized a multiple pane. In the multiple pane, a pair of glass panels are arranged facing each other, and a plurality of spacers are interposed between the pair of glass panels, and the pair of glass panels are bonded with a hermetic bond at peripheries thereof, and thus an inside space is defined by the pair of glass panels and the hermetic bond. The air in the inside space is exhausted to reduce the pressure of the inside space.

Such a multiple pane in which the pressure of the inside space is reduced has an air layer with a pressure lower than the atmospheric pressure between the pair of glass panels, and thus it is expected to show a greater heat insulating effect, a greater condensation-prevention effect, a greater sound-dampening effect that are greater than those of a multiple pane in which two glass panels are simply stacked. In recent years, the importance of saving energy has increased, and therefore the multiple pane including the space whose pressure is reduced has attracted a great attention as one type of eco-glass. The depressurized multiple pane is manufactured by: applying a sealant (e.g., low melting glass frit) onto the peripheries of the pair of glass panels separated at a predetermined distance by a plurality of spacers such as metal and ceramics; heating the sealant to hermetically bond the peripheries and thus form a space; and thereafter exhausting air in the inside space via an exhaust pipe made of glass or metal.

For example, Patent document 1 (JP 5-501896 A) and Patent document 2 (JP 11-324059 A) disclose the above-mentioned background arts.

SUMMARY

Technical Problem

The present disclosure is aimed to provide a multiple pane in which spacers can be formed easily.

Solution to Problem

The multiple pane according to the present disclosure includes a pair of glass panels, a plurality of spacers interposed between the pair of glass panels, and a hermetic bond to hermetically bond peripheries of the pair of glass panels to each other. The multiple pane contains a space formed between the pair of glass panels, and the space is to be sealed so as to be in a reduced pressure state. Each of the plurality of spacers is a porous member.

Advantageous Effects of Invention

In the multiple pane according to the present disclosure, each of a plurality of spacers is a porous member, and therefore the plurality of spacers with desired shapes can be easily formed at desired positions between a pair of glass panels.

Figure 1A:
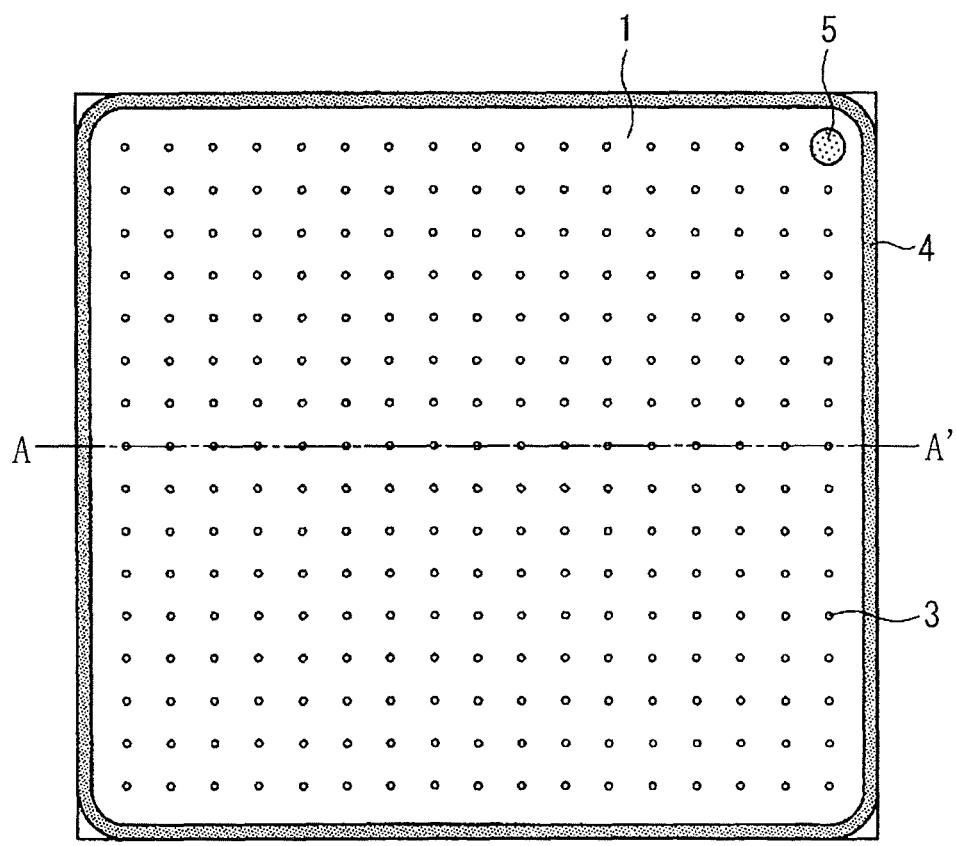
FIGS. 1A and 1B are a top view and a cross section illustrating a configuration of the multiple pane of Embodiment 1, respectively.

The figures depict one or more implementations in accordance with the present teaching, by way of example only, not by way of limitations.

DESCRIPTION OF EMBODIMENTS

A multiple pane according to the present disclosure includes: a pair of glass panels; a plurality of spacers interposed between the pair of glass panels; and a hermetic bond to hermetically bond peripheries of the pair of glass panels to each other. The multiple pane contains a space formed between the pair of glass panels, the space being to be sealed so as to be in a reduced pressure state. Each of the plurality of spacers is a porous member.

Since the multiple pane according to the present disclosure is configured as described above, it is possible to easily form the plurality of spacers with desired shapes at desired positions between the pair of glass panels. Therefore, it is possible to provide the multiple pane with heat insulation properties and sound insulation properties. Besides, since the spacers are the porous members, the spacers can change their shapes to a predetermined extent, even in a state where the spacers are formed on the glass panel. Therefore, even in a case where there are slight variations between heights of the spacers on the glass panel, the variations are reduced by changes in the shapes of the spacers when the glass panel with the spacers is attached to the opposite glass panel. Hence, the spacers are in good contact with the glass panels in entire faces of the pair of glass panels, and the multiple pane with high strength can be obtained.

In the multiple pane, it is preferable that the plurality of spacers are made from a mixture of a material to compose the plurality of spacers and a binder, and each of the plurality of spacers has pores formed by removing the binder. The material to compose the plurality of spacers is mixed with the binder, and parts of the resultant mixture are arranged at predetermined positions. Subsequently, the binder is removed from each part of the resultant mixture. Consequently, formed can be the plurality of spacers having strength enough to keep an interval between the pair of glass panels to a predetermined value.

In a preferable example, an infrared reflective film may be on at least one of the pair of glass panels. The infrared reflective film transmits visible radiation but reflects infrared radiation. Accordingly, a space between the glass panels is in a reduced pressure state as well as heat insulating effects are obtained owing to the infrared reflective film, and hence a multiple pane with high heat insulating properties can be obtained.

In the multiple pane according to the present disclosure, the plurality of spacers include spacers on a peripheral region of the pair of glass panels and spacers on a central region of the pair of glass panels, and an interval between the spacers on the peripheral region may be different from an interval between the spacers on the central region. Besides, the spacers on the peripheral region of the pair of glass panels may be different in a size in a cross section along a face direction of the glass panel from the spacers on a central region of the glass panel.

Besides, the pair of glass panels are preferably curved in at least one direction. Accordingly, a multiple pane which is curved as a whole can be realized.

The multiple pane according to the present disclosure preferably includes a printed patterned film formed on a region of at least one of the pair of glass panels, which overlaps, in a thickness direction of the multiple pane, a region where the hermetic bond is provided, so as to cover the hermetic bond. Besides, the multiple pane according to the present disclosure preferably includes a pressure reducer which is for making the space be in a pressure reduced state and is provided on at least one of the pair of glass panels; and a printed patterned film formed on a region of at least one of the pair of glass panels, which overlaps, in a thickness direction of the multiple pane, a region where the pressure reducer is provided, so as to cover the pressure reducer. Accordingly, it is possible to obtain the multiple pane with preferable appearance in which the hermetic bond and/or the pressure reducer are hidden.

Besides, it is preferable that at least one of: shapes of the plurality of spacers in a cross section along a face direction of the pair of glass panels; sizes of the plurality of spacers in the cross section; and intervals of the plurality of spacers is adjusted such that the plurality of spacers represent a visible and meaningful pattern. Accordingly, it is possible to display information for users by positive use of visibility of the plurality of spacers.

In this case, the plurality of spacers may have different colors depending on positions of the plurality of spacers, and the visible and meaningful pattern represented by the plurality of spacers is a colored pattern.

Embodiments will be described below in detail with referring to the drawings appropriately.

Note that the applicants provide the attached drawings and the following description in order to enable any person skilled in the art to sufficiently understand the present disclosure, and do not intend to limit the subject matters of claims. For convenience of explanation, the drawings referred below focus on necessary portions of the multiple pane for describing the present disclosure illustrated in a simplified manner. Therefore, the multiple pane described with reference to the drawings may have any configuration which is not shown in the drawings referred. Furthermore, dimensions of components shown in the drawings do not necessarily reflect dimensions and dimensional ratios of components in practice, exactly.

Furthermore, in the present specification, reducing a pressure of a space to be sealed between the pair of glass panels means allowing the space between the pair of glass panels to be in a state of having a smaller pressure than the atmospheric pressure of the outside. Furthermore, the reduced pressure state in the present specification means a state in which a pressure of the space to be sealed is smaller than the atmospheric pressure of the outside. The reduced pressure state includes a vacuum state in which air inside the space is exhausted to reduce the pressure of the space, and the vacuum state is not limited by degrees of vacuum. In this regard, the reduced pressure state in the present specification includes a state where at least one of various gases such as an inert gas is supplied to the space after exhausting the air inside the space, so long as the pressure of the space containing such a gas is consequently smaller than the atmospheric pressure.

Embodiment 1

A multiple pane of Embodiment 1 disclosed in the present application will be described below using FIGS. 1A and 1B.

Figure 1B:
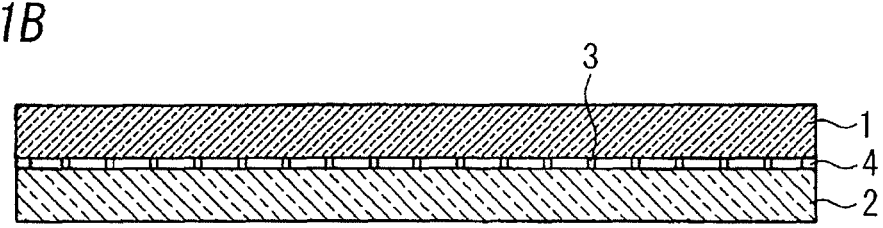

FIG. 1A is a top view of the multiple pane of the present embodiment, and FIG. 1B is a cross section of the multiple pane of the present embodiment. FIG. 1B shows a cross sectional configuration taken along the line A-A' of FIG. 1A.

As shown in FIGS. 1A and 1B, the multiple pane includes a pair of glass panels 1 and 2 separated at a distance from each other by a plurality of spacers 3 which are porous members, and a seal 4, which is a hermetic bond, to hermetically bond peripheries of the pair of glass panels 1 and 2 to each other. A space enclosed by the pair of glass panels 1 and 2 and the seal 4 is to be sealed. The air in the space is exhausted via an outlet (not shown) formed in the glass panel 1 in order to reduce the pressure of the space to a predetermined pressure, and then the outlet is sealed with a metal cap 5, for example. Accordingly, the space becomes a sealed space in the reduced pressure state. As described above, the outlet provided to the glass panel to make in a reduced pressure state the space to be sealed, and the metal cap to close the outlet may exemplify the pressure reducer.

The glass panel 1 and the glass panel 2 are both formed of a sheet of float glass with a thickness of 3 mm, for example. The glass panel 1 has a hole for exhausting, which is used as the outlet and not shown in the drawings.

The spacers 3 are arranged on the glass panel 2 to keep an interval between the glass panel 1 and the glass panel 2 to a predetermined value. The arrangement pitch of the spacers is, 2 cm, for example. Each of the spacers has a circular prismatic shape with a diameter of 0.2 mm and a height of 0.2 mm, and is porous glass made of a glass material. Each spacer used in the multiple pane of the present embodiment is porous glass and has a density which can be adjusted by adding low melting glass microparticles and adding when requested various inorganic microparticles. The spacers are formed on the glass panel 2 by photolithography.

Each of the spacers according to the present disclosure is the porous member having a plurality of pores. More specifically, the spacers of the present disclosure are made from a paste of a glass material applied on the glass panel by the photolithography as described above. In the formation of the spacers, organic components used as a binder, various solvent such as a photosensitizing agent and an ultraviolet absorber, and resin components including other impurities are mostly vaporized in steps of drying and sintering subsequent to applying, and consequently the spacer has the pores that are vacancies of vaporized components. In this regard, the pores of the spacer, which is the porous member according to the present disclosure, include both of an open pore which is exposed on a surface of the spacer and a closed pore which is not exposed on the surface.

Besides, the phrase that "the spacer according to the present disclosure is formed on one glass panel of the pair of glass panels" refers to both of a case where the spacer is formed directly on the glass panel and a case where the spacer is formed on one or two or more thin films on the glass panel, namely, indirectly formed on the glass panel.

When the spacer is made from a photosensitive paste containing a low melting glass material, microparticles of an inorganic material, and a binder by photolithography, the porosity of the spacer which is the porous member ranges from about 1% to 20%, for example. The porosity varies, depending upon components for the spacer, types of resin components such as the binder used for forming the spacer, composition ratios of the photosensitive paste, and manufacturing conditions for the spacer, and the like.

Besides, the spacer according to the present disclosure includes not only the aforementioned spacer having the pores formed by removing the binder but also a spacer which is a porous member having pores derived from a pore[s] that a component to compose the spacer originally has. Such a component originally having a pore[s] may be, for example, hollow silica including a hollow inside itself. In any case, the spacer used for the multiple pane according to the present disclosure is the porous member made of the aforementioned material e.g., glass, and do not include a core member made of glass, metal, or the like inside itself, differently from the spacer included in the multiple pane described in the background art.

The seal 4 is composed of low melting glass frit, for example, and formed by applying the low melting glass frit, with a dispenser for example, onto the periphery of the glass panel 2 on which the spacers 3 have been formed, and then drying the low melting glass frit. The low melting glass frit may be: a bismuth-based seal containing 70% or more $Bi_2O_3$, 15% or less $B_2O_3$, 15% or less ZnO, and 5% or more mixture of organic substances such as ethyl cellulose and terpineol; or a frit paste.

Incidentally, a method of preparing the multiple pane of the present embodiment will be described.

First, the spacers 3 are formed on the glass panel 2 by photolithography. The detailed method for preparing the spacers 3 will be described below. Thereafter, the seal 4 is applied onto the periphery of the glass panel 2 with a dispenser for example, and then is dried. Next, the glass panel 1 and the glass panel 2 are introduced into a furnace with being arranged to face each other, and heated to melt the low melting glass frit to bond the peripheries of the glass panels 1 and 2 with the seal 4. Thereafter, air inside the space in the multiple pane in which the glass panel 1 and the glass panel 2 are bonded is exhausted via an outlet (not shown) with a rotary pump, for example, and thereafter the outlet is sealed by bonding the metal cap 5 to the outlet.

An example of a formation of the spacers 3 by photolithography will be described below.

First, as a material for forming the spacer 3, a photosensitive paste is prepared. The photosensitive paste is prepared by compounding various components such as inorganic microparticles (e.g., silicon dioxide), an ultraviolet absorber, a photosensitive polymer, a photosensitive monomer, a photopolymerization initiator, and low melting glass microparticles (e.g., bismuth zinc-based particles) so as to have a predetermined composition, and mixing and dispersing them with a triple-roller or a kneading machine.

The photosensitive paste may contain a filler composed of: heat resistant ceramic particles such as alumina, zirconia, titan oxide, forsterite, mullite, silicon nitride, aluminum nitride, and silica; or high melting glass particles. Accordingly, it is possible to suppress volume contraction in forming the spacer. The high melting glass available as the filler may have a glass-transition temperature ranging from 570° C. to 1200° C. and a softening temperature ranging from 620° C. to 1200° C., and may have a composition of 15 to 50 wt % silicon oxide, 5 to 20 wt % boron oxide, 15 to 50 wt % aluminum oxide, and 2 to 10 wt % barium oxide, for example.

The viscosity of the photosensitive paste is appropriately adjusted by selecting addition ratios of inorganic microparticles, a thickening agent, an organic solvent, a plasticizer, and or a precipitation inhibitor, and preferably falls within a range of 200 to 200000 cps.

The specific example of the composition of the photosensitive paste may be 43 wt % low melting glass microparticles, 10 wt % zinc oxide fine powder, 26 wt % resin components containing a photosensitive monomer, a photosensitive polymer, a photopolymerization initiator, an ultraviolet absorber, a sensitizer, and an auxiliary sensitizer, and 21 wt % organic solvent serving as the binder.

Thereafter, the photosensitive paste is applied entirely on a surface of the glass panel 2 or partially thereon, namely, on parts of the surface of the glass panel 2 on which the spacers 3 are to be formed. The application method may be screen printing, bar-coating, a roll-coating, or the like. The application thickness is adjusted by selecting the number of times of application, a mesh of the screen, and a viscosity of the paste.

Then, mask exposure is performed with a photo mask being over the photosensitive paste applied onto the glass panel. The shape and dimensions of the spacers in a cross section in a face direction of the glass panel and the positions of the spacers can be appropriately adjusted to desired ones by adjusting a pattern of the mask. The mask used is selected from a negative-type mask and a positive-type mask in accordance with types of the photosensitive organic components. An active light source used in the exposure may emit near-ultraviolet rays, ultraviolet rays, electron beam, or X-rays, for example. Among them, the active light source to emit ultraviolet rays is preferable, and may be a low-pressure mercury lamp, a high-pressure mercury lamp, an ultrahigh-pressure mercury lamp, or a halogen lamp. Among them, the ultrahigh-pressure mercury lamp is preferable. Although conditions for the exposure vary depending on a desired application thickness, the exposure may be conducted for a time of 10 to 30 min using an ultrahigh-pressure mercury lamp with an output of 5 to 100 mW/cm$^2$, for example. After the exposure, development is conducted with a developer by immersing or spraying. The developer may be a commercially available alkaline developer.

Subsequently, sintering is performed in a sintering furnace. The sintering atmosphere and the temperature vary depending on types of the paste and the panel, but the sintering may be performed under air or under nitrogen atmosphere. The sintering may be performed at the sintering temperature ranging 520° C. to 610° C., for example, kept for a time ranging from 10 to 60 min.

In the aforementioned manner, for the multiple pane of the present embodiment, it is possible to form the spacers 3 of the porous glass each of which has a predetermined shape in cross section, a predetermined size, and a predetermined height, on the glass panel 2 at a predetermined pitch. Besides, these spacers 3 have high adhesion to the glass substrate 2. Furthermore, in the multiple pane of the present embodiment, the spacers are made from the photosensitive material, and therefore can be formed in a smaller size than the known spacers having the core members. Accordingly, when the multiple pane of the present embodiment is used for a window, for example, the spacers are small in size and thus it is difficult for human eyes to detect the spacers. Hence, the window excellent in visibility can be realized.

Note that, when the spacers 3 which are the glass porous member and used in the multiple pane of the present embodiment are made from a paste material containing 53 wt % inorganic and glass microparticles, 26 wt % resin components containing a photosensitive monomer, a photosensitive polymer, and the like, and 21 wt % organic solvent serving as binder, the resultant spacers 3 after sintering contains 99 wt % inorganic and glass microparticles and 1 wt % resin components.

Embodiment 2

A multiple pane of the Embodiment 2 according to the present disclosure will be described below using FIGS. 2A and 2B.

Figure 2A:
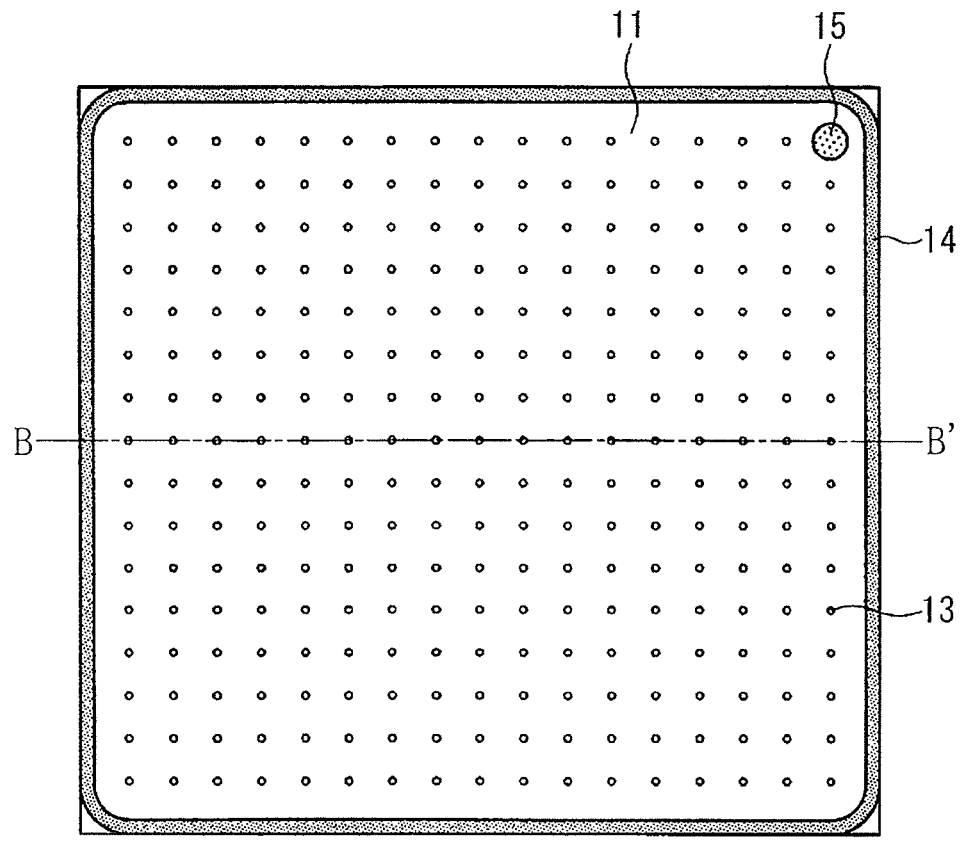
FIGS. 2A and 2B are a top view and a cross section illustrating a configuration of the multiple pane of Embodiment 2, respectively.
Figure 2B:
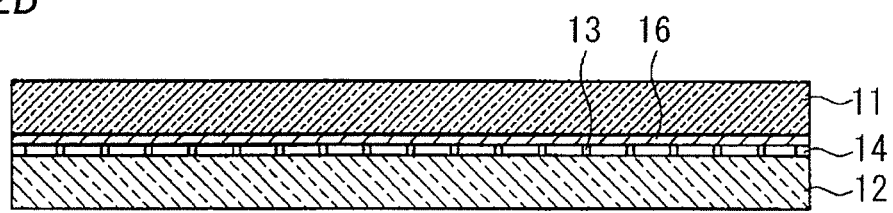

FIG. 2A is a top view of the multiple pane of the present embodiment, and FIG. 2B is a cross section of the multiple pane of the present embodiment. FIG. 2B shows a cross sectional configuration taken along the line B-B' of FIG. 2A.

As shown in FIGS. 2A and 2B, the multiple pane of the present embodiment includes a pair of glass panels 11 and 12 separated at a distance from each other by a plurality of spacers 13 each of which is a porous member, and a seal 14, which is a hermetic bond, to hermetically bond peripheries of the pair of glass panels 11 and 12 to each other. Air in a space enclosed by the pair of glass panels 11 and 12 and the seal 14 is exhausted via an outlet (not shown) formed in the glass panel 11 in order to reduce a pressure of the space to a predetermined pressure, and then the outlet is sealed with a metal cap 15, for example. Accordingly, the space becomes a space in the reduced pressure state.

The glass panel 11 and the glass panel 12 are both formed of a sheet of float glass with a thickness of 3 mm, for example. The glass panel 11 has a hole for exhausting which is the outlet and not shown in the drawings. An infrared reflective film 16 is formed on a surface, which faces the glass panel 12, of the glass panel 11, that is, an internal surface of the multiple pane. The infrared reflective film 16 has a function of transmitting visible radiation but reflecting infrared radiation.

The infrared reflective film 16 is a thin film of tin oxide ($SnO_2$), for example. The infrared reflective film 16 has infrared reflective characteristics of reflecting more amounts of infrared radiation in an approximate wavelength range of 800 nm to 2000 nm and far-infrared radiation than an amount of visible radiation in the wavelength range between about 400 nm to about 800 nm.

The spacers 13 are arranged on the glass panel 12 at a pitch of 2 cm, for example. Each of the spacers 13 has a circular prismatic shape with a diameter of 0.3 mm and a height of 0.2 mm, and is composed of porous glass made of a glass material. Each of the spacers 13 of the multiple pane of the present embodiment is made of glass microparticles including hollow silica, for example, and formed on the glass panel 12 by photolithography. In this regard, the hollow silica has a particle diameter of 10 to 300 nm and a shell thickness of about 1 to 15 nm.

The seal 14 is composed of low melting glass fit, for example, and formed by applying the low melting glass frit, with a dispenser for example, onto the periphery of the glass panel 12 on which the spacers have been formed, and then drying the low melting glass frit. The low melting glass fit may be: a bismuth-based seal containing 70% or more $Bi_2O_3$, 15% or less $B_2O_3$, 15% or less ZnO, and 5% or more mixture of organic substances such as ethyl cellulose and terpineol; or a frit paste.

A method of preparing the multiple pane of the present embodiment will be described.

First, on the surface of the glass panel 11 to be opposite the glass panel 12, the infrared reflective film 16 is formed by CVD, for example. In this regard, the glass panel 11 may be low-reflective glass (generally referred to as LowE glass or the like) including the infrared reflective film 16 at its one surface.

Then, the spacers 13 are formed on the glass panel 12 by photolithography. The method for preparing the spacers 13 may be the same as the method described above in Embodiment 1. Thereafter, the seal 14 is applied onto the periphery of the glass panel 12 with a dispenser, for example, and then is dried. Subsequently, the glass panel 11 and the glass panel 12 are introduced into a furnace with being arranged such that the surface of the glass panel 11 on which the infrared reflective film 16 has been formed is to be inside the multiple pane, namely, the infrared reflective film 16 faces the spacers 13 on the glass panel 12, and heated to melt the low melting glass frit to bond the peripheries of the glass panels 11 and 12 with the seal 14. Thereafter, air in a space inside the multiple pane in which the glass panel 11 and the glass panel 12 are bonded is exhausted via an outlet (not shown) with a rotary pump, for example, and thereafter the outlet is sealed by bonding the metal cap 15 thereto.

As described above, the multiple pane of the present embodiment includes, at the inside thereof, the infrared reflective film 16 on the surface of the glass panel 11. Therefore, when the multiple pane of the present embodiment is used as a window glass, it is possible to shield heat from sun light with the infrared reflective film 16, and improve a heat insulating effect between an inside and an outside of a room. Besides, in the multiple pane of the present embodiment, the spacers 13 which are the porous members contain hollow silica with the particle diameter of 10 to 300 nm and the shell thickness of about 1 to 15 nm, for example, and therefore the spacers 13 have improved heat insulating properties. Hence, it is possible to effectively prevent heat from transferring between the pair of glass panels 11 and 12 through the spacers 13. Accordingly, it is possible to further improve heat insulating characteristics of the multiple pane.

Note that, in the present embodiment, the case of the infrared reflective film made of tin oxide ($SnO_2$) is described. However, the infrared reflective film may be made of other oxide such as ITO (Indium tin oxide) and zinc oxide. Besides, the infrared reflective film may be a multilayer film of silver and oxide which are stacked and formed with a sputtering device.

Figure 3A:
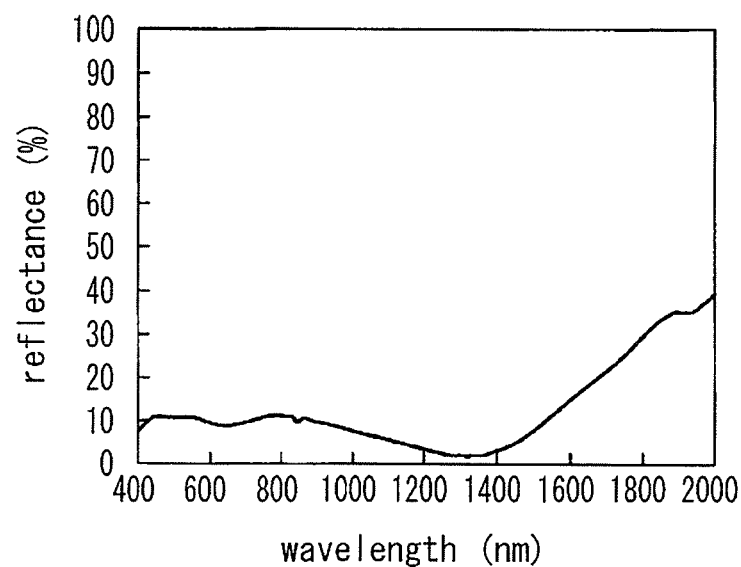
FIGS. 3A and 3B show examples of spectral reflectance characteristics of individual infrared reflective films.
Figure 3B:
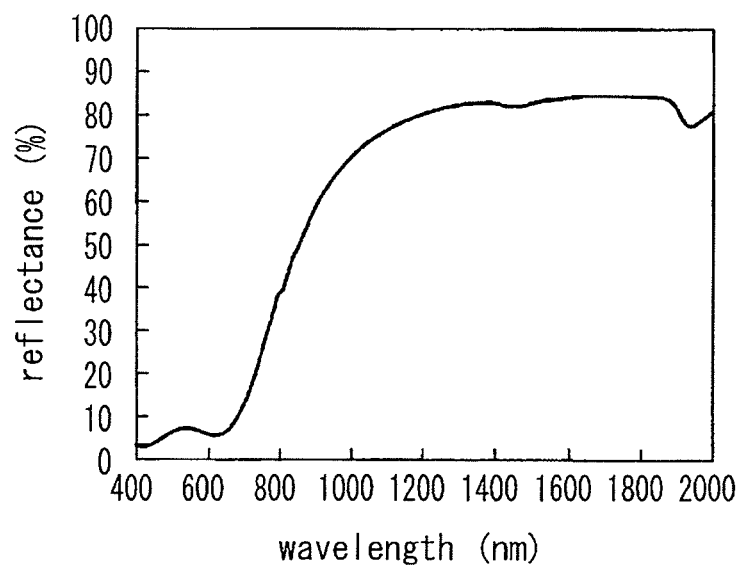

FIGS. 3A and 3B show examples of spectral reflectance characteristics of individual infrared reflective films.

FIG. 3A shows spectral reflectance characteristics of the infrared reflective film which is the tin oxide ($SnO_2$) film taken as an example in the present embodiment, and FIG. 3B shows spectral reflectance characteristics of the infrared reflective film which is a stack of silver and oxide.

The tin oxide ($SnO_2$) film whose spectral reflectance characteristics are shown in FIG. 3A is formed by CVD (chemical vapor deposition) on the glass panel and has a thickness of 100 μm. As shown in FIG. 3A, the infrared reflective film of the tin oxide ($SnO_2$) film has excellent characteristics of having reflectance of 10% for radiation in the visible range of 400 to 800 nm, but having high reflectance of radiation in the infrared range, and in particular, having reflectance of 20% or more for radiation in the far-infrared range in which the wavelength is 1600 nm or more.

The infrared reflective film of the tin oxide ($SnO_2$) film whose spectral reflectance characteristics are shown in FIG. 3A can be formed by CVD which is performed in a high temperature step for manufacturing the glass panel. Therefore, using such an infrared reflective film has an advantage that the glass panel with the infrared reflective film can be formed at a low cost. Moreover, the infrared reflective film of the tin oxide ($SnO_2$) film formed in the step at a high temperature has an advantage of being less likely to deteriorate in a subsequent high temperature step and under the environment. Hence, as described below, it is possible to form the spacers on the infrared reflective film. Alternatively, the infrared reflective film can be formed on an outer surface of the multiple pane in view of the fact that the above infrared reflective film is less likely to deteriorate due to changes in humidity and temperature, and oil from user's fingers.

The film having a stack configuration of silver and oxide film whose spectral reflectance characteristics are shown in FIG. 3B is an infrared reflective film with a thickness of 100 nm formed by stacking on the glass panel a zinc oxide film with a thickness of 30 nm, a silver (Ag) film with a thickness of 10 nm, a zinc oxide film with a thickness of 20 nm, a silver (Ag) film with a thickness of 10 nm, and a zinc oxide film with a thickness of 30 nm by CVD. As shown in FIG. 3B, the infrared reflective film with the stack configuration of silver and a zinc oxide film has excellent characteristics of having low reflectance ranging 5% to 10% for radiation in the visible range of about 400 to 700 nm, but having high reflectance of red light radiation and longer wave radiation than red light having wavelengths of 750 nm or more, and in particular, having reflectance of about 80% or more for infrared radiation of a wavelength of about 1000 nm or more.

As shown in FIG. 3B, the infrared reflective film of stacked films of silver and an oxide film has high reflective characteristics with regard to infrared radiation. Therefore, it is possible to improve a shielding effect of heat from sun light of the multiple pane including the infrared reflective film, and obtain a multiple pane showing a high heat insulating effect. In this regard, an infrared reflective film formed by sputtering is prone to be poor in stability to high temperature and the environment, compared with the aforementioned infrared reflective film formed by CVD. Therefore, it is necessary to pay attention on an infrared reflective film in a case where a spacer is formed on the infrared reflective film and/or a case where the infrared reflective film is formed on the outer surface of the multiple pane.

Besides, in the multiple pane of the present embodiment, when a material for composing the porous glass of the spacer 13 contains glass, crystallized glass, and a filler such as titanium oxide and zirconium oxide, it is possible to improve strengths of the spacer 13 to mechanical and thermal shocks. The crystallized glass refers to a material, which is formed by dispersing crystals having negative thermal expansion properties into glass to offset thermal expansion of the glass with the negative thermal expansion of the crystal and consequently has a small coefficient of thermal expansion.

Furthermore, in a case of using a material having a coefficient of thermal expansion equivalent to the coefficient of thermal expansion of the glass panel ranging from $8.5*10^{-6}$ to $9.0*10^{-6 \circ}$ C. as the material for the spacer 13, it is possible to reduce strain due to stress caused by a difference in the coefficient of thermal expansion in a high temperature process. Therefore, it is possible to improve strength of the multiple pane.

Besides, by selecting the composition of the material composing the porous glass of the spacer 13 so that the material contains an electrical conductive oxide material such as ITO, zinc oxide, titanium oxide, and tin oxide, it is possible to impart the infrared reflective characteristics to the spacer 13 itself. Then, owing to the spacers made of the material with the infrared reflective characteristics, it is possible to further improve infrared reflective performance of the infrared reflective film on the glass panel, and therefore to provide the multiple pane showing higher heat insulating performance.

Modifications of the multiple pane described in the Embodiment 2 each including the infrared reflective film on the glass panel will be described below using FIGS. 4A and 4B.

Figure 4A:
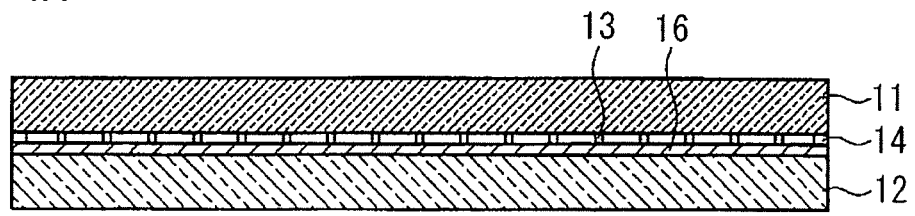
FIGS. 4A and 4B are cross sections of cross sectional configurations of the first modification and the second modification of the multiple pane of Embodiment 2, respectively.

FIG. 4A is a cross section of the first modification of the multiple pane including the infrared reflective film as described in the present embodiment. FIG. 4B is a cross section of the second modification of the multiple pane including the infrared reflective film as described in the present embodiment. Each of FIGS. 4A and 4B shows a cross sectional configuration of the multiple pane of the present embodiment as with the cross sectional configuration shown in FIG. 2B.

The first modification of the multiple pane shown in FIG. 4A includes the infrared reflective film 16 inside the multiple pane and on one of the pair of glass panels 11 and 12. In contrast to the configuration shown in FIG. 2B, the infrared reflective film 16 is formed on a surface of the glass panel 12 on which the spacers are to be formed, the surface facing the glass panel 11. The infrared reflective film 16 has a function of reflecting infrared radiation. Note that the first modification of the multiple pane of which the cross-sectional configuration is shown in FIG. 4A is different from the configuration shown in FIG. 2B in only a position of the infrared reflective film 16 and the same as the configuration shown in FIG. 2B in materials and shapes of the glass panels 11 and 12, the spacers 13, the seal 4, and the infrared reflective film 16.

The first modification of the multiple pane of which the cross-sectional configuration is shown in FIG. 4A may be prepared by the following method. First, on the surface of the glass panel 12, the infrared reflective film 16 is formed by CVD, for example. As described above, when the spacers are formed on the infrared reflective film, it is preferable that the infrared reflective film can be formed by a method (e.g., CVD) which enables improvement of the stability of the resultant infrared reflective film.

Then, the spacers 13 are formed on the infrared reflective film 16 on the glass panel 12 by photolithography. The method for preparing the spacers 13 may be the same as the method described above in Embodiments 1 and 2. Thereafter, the seal 14 is applied onto the periphery of the glass panel 12 with a dispenser, for example, and then is dried. Subsequently, the glass panel 11 and the glass panel 12 are introduced into a furnace with being arranged such that the glass panel 11 overlies the spacers 13 on the glass panel 12, and then are heated to melt the low-melting glass to bond the peripheries of the glass panels 11 and 12 with the seal 14. Thereafter, air in a space inside the multiple pane in which the glass panel 11 and the glass panel 12 are bonded is exhausted via an outlet (not shown) with a rotary pump, for example, and thereafter the outlet is sealed by bonding the metal cap 15 to the outlet.

The first modification of the multiple pane formed in the above-described manner includes the infrared reflective film 16 inside the multiple pane, and therefore has high heat insulating characteristics, as with the multiple pane of which the cross-sectional configuration is shown in FIG. 2B.

Figure 4B:
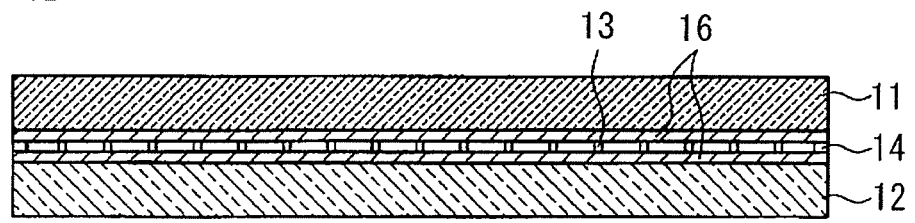

The second modification of the multiple pane shown in FIG. 4B includes infrared reflective films 16 that are inside the multiple pane and are on the pair of glass panels 11 and 12 respectively. That is, in contrast to the configurations shown in FIGS. 2B and 4A, the infrared reflective films 16 are formed respectively on the surface of the glass panel 12 facing the glass panel 11 and on the surface of the glass panel 11 facing the glass panel 12. The infrared reflective films 16 each have a function of reflecting infrared radiation. Note that the second modification of the multiple pane of which the cross-sectional configuration is shown in FIG. 4B is different from the multiple panes shown in FIGS. 2B and 4A in only a position of the infrared reflective film 16 and the same as the multiple panes shown in FIGS. 2B and 4A in materials and shapes of the glass panels 11 and 12, the spacers 13, the seal 14, and the infrared reflective film 16.

The second modification of the multiple pane of which the cross-sectional configuration is shown in FIG. 4B may be prepared by the following method.

First, on the surface of the glass panel 12 facing the glass panel 11, the infrared reflective film 16 is formed by CVD, for example. Also in this case, when the infrared reflective film is formed on the glass panel 12, it is preferable that the infrared reflective film can be formed by a method (e.g., CVD) which enables improvement of the stability of the resultant infrared reflective film.

Then, the spacers 13 are formed on the infrared reflective film 16 on the glass panel 12 by photolithography. The method for preparing the spacers 13 may be the same as the method described above in Embodiments 1 and 2. Thereafter, the seal 14 is applied onto the periphery of the glass panel 12 with a dispenser, for example, and then is dried.

Besides, on the surface of the glass panel 11, the infrared reflective film 16 is formed by CVD or sputtering, for example. Subsequently, the glass panel 11 and the glass panel 12 are introduced into a furnace with being arranged such that the infrared reflective film 16 of the glass panel 11 is inside the multiple pane, namely, the infrared reflective film 16 of the glass panel 11 faces the spacers 13 on the glass panel 12. After that, the glass panels 11 and 12 are heated to melt the low-melting glass to bond the peripheries of the glass panels 11 and 12 with the seal 14. Thereafter, air in a space inside the multiple pane in which the glass panel 11 and the glass panel 12 are bonded is exhausted via an outlet (not shown) with a rotary pump, for example, and thereafter the outlet is sealed by bonding the metal cap 15 to the outlet.

The second modification of the multiple pane formed in the above-described manner includes the infrared reflective films 16 individually on the pair of glass panels 11 and 12 and inside the multiple pane, and therefore has higher heat insulating characteristics, compared with the multiple pane of which the cross-sectional configuration is shown in FIG. 2B and the multiple pane of which the cross-sectional configuration is shown in FIG. 4A.

The following explanation is made to the heat insulating effects of the multiple panes including the infrared reflective film[s] shown in the present embodiment.

In view of the application of the multiple pane to window glass, thermal transmittance ($W/m^2K$) is adopted as an index of the heat insulating effect. The thermal transmittance (U value or K value) represents a numerical value of overall heat insulating performance of a wall of a building. The thermal transmittance is defined as an amount of heat transmitting transmitted through a wall or a window with the area of 1 $m^2$ per 1 hour measured in watt in a condition that a difference in temperature between both side of the wall or the window is 1° C. The smaller thermal transmittance means the less heat transfer, that is, an excellent insulating performance.

Comparison was conducted based on a specific structure of the multiple pane described in the present embodiment in which the glass panels each are made of float glass and have the same thickness of 3 mm and the spacers have the same height of 0.2 mm and thus the total thickness is 6.2 mm. With regard to the multiple pane devoid of the infrared reflective film, the thermal transmittance was 2.7 $W/m^2K$. In contrast, with regard to the multiple pane including the infrared reflective film having a thickness of about 100 nm which was made of tin oxide by CVD inside the multiple pane and on one side of one of the two glass panels and had spectral reflectance characteristics shown in FIG. 3A, the thermal transmittance was 1.7 $W/m^2K$. With regard to the multiple pane including the infrared reflective film having a thickness of about 100 nm which was constituted by five layers made by stacking silver layers and zinc oxide layers alternately by sputtering and had spectral reflectance characteristics shown in FIG. 3B, the thermal transmittance was 1.0 $W/m^2K$. With regard to the multiple pane including: the infrared reflective film having a thickness of about 100 nm which was made of tin oxide by CVD on one of the two glass panels and had spectral reflectance characteristics shown in FIG. 3A; and the further infrared reflective film having a thickness of about 100 nm which was constituted by five layers made by stacking silver layers and zinc oxide layers alternately by sputtering on the other glass panel, and had spectral reflectance characteristics shown in FIG. 3B, the thermal transmittance was 0.9 $W/m^2K$. This comparison shows that the multiple pane including the at least one infrared reflective film has the high heat insulating performance. Besides, the heat insulating performance of the multiple pane including the at least one infrared reflective film varies depending upon the material of the infrared reflective film and the number of infrared reflective films.

Although the reflective film is formed on the surface of the pair of glass panels inside the multiple pane in the above embodiments and the modifications, the infrared reflective film may be formed outside on the multiple pane, and in this case, heat insulating effect owing to reflection of infrared radiation can be obtained. However, as described above, the infrared reflective film formed by sputtering, for example, is susceptible to the surrounding, and therefore there is high possibility of occurring problems such as deterioration of the infrared reflective characteristics and change in color of the infrared reflective film. Therefore, when the infrared reflective film is formed at the outside on the glass panel composing the multiple pane, it is effective to adopt a configuration for protecting the infrared reflective film. For example, the method of preparing the infrared reflective film may be modified so that the infrared reflective film is less likely to deteriorate, for example, by changing the material or configuration of the infrared reflective film. Furthermore, the infrared reflective film may be covered with a further glass panel or a resin panel.

Besides, when the infrared reflective film is made of an electrical conductive material as with that of the multiple pane of the present embodiment, it is noted that the infrared reflective film shows high electromagnetic shielding effect. In recent circumstances where wireless telecommunication means such as a mobile phone has been developed, when the multiple pane used as window glass shows high electromagnetic shielding effect, there may be a unfavorable possibility that a user in a building fails to communicate by use of a mobile phone, for example. In contrast to this, in a situation where usage of a mobile phone is not preferable such as in a hospital or in a concert hall, window using the multiple pane with high electromagnetic shielding effect may offer an effect of restricting usage of a mobile phone. As described above, in the case of forming the infrared reflective film on the multiple pane, it is preferable to design the infrared reflective film in view of the electromagnetic shielding in addition to the intended infrared reflective characteristics of the infrared reflective film. In designing the infrared reflective film, the material used for the infrared reflective film may be selected, and it may be determined whether the infrared reflective film is formed on only one glass panel of the multiple pane or on both of the glass panels.

Embodiment 3

A multiple pane of Embodiment 3 according to the present disclosure will be described below using FIGS. 5A to 7.

Figure 5A:
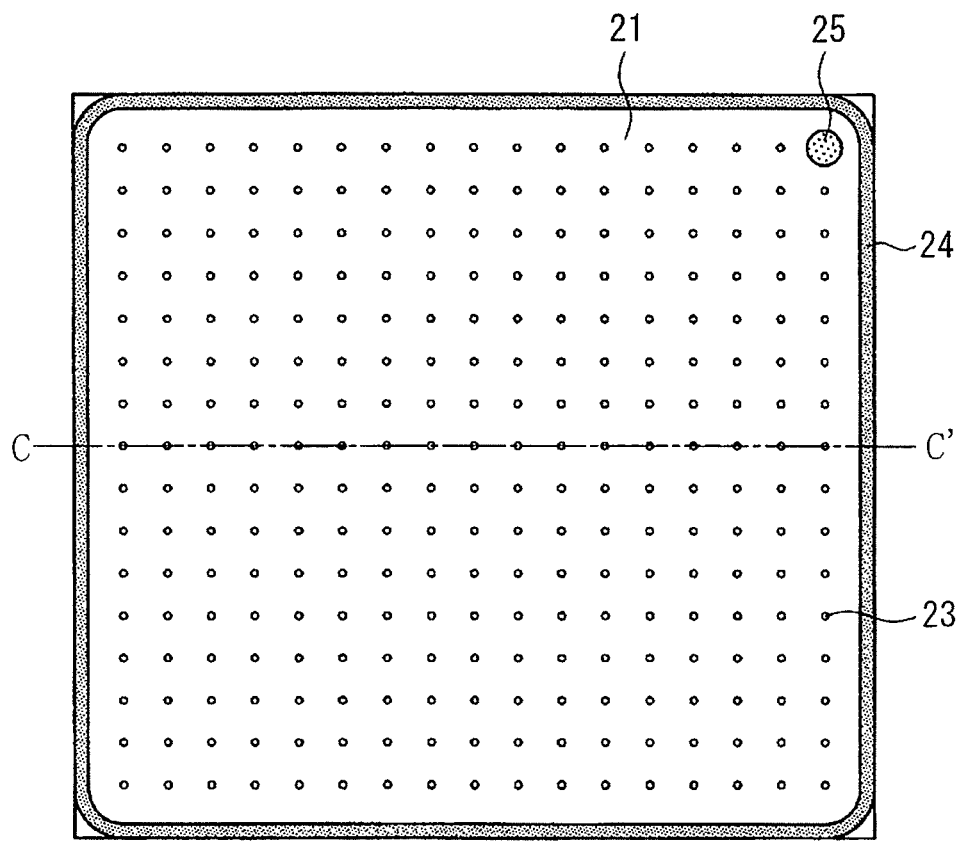
FIGS. 5A and 5B are a top view and a cross section illustrating a configuration of the multiple pane of Embodiment 3, respectively.
Figure 5B:
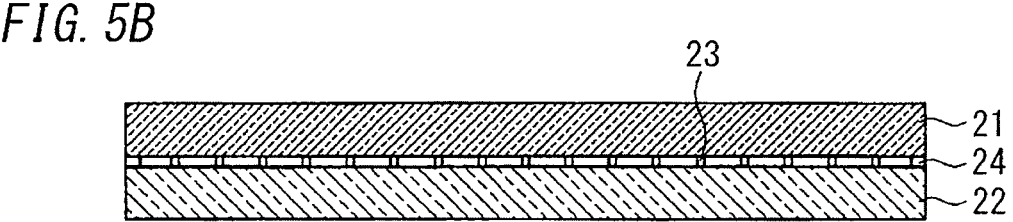
Figure 6:
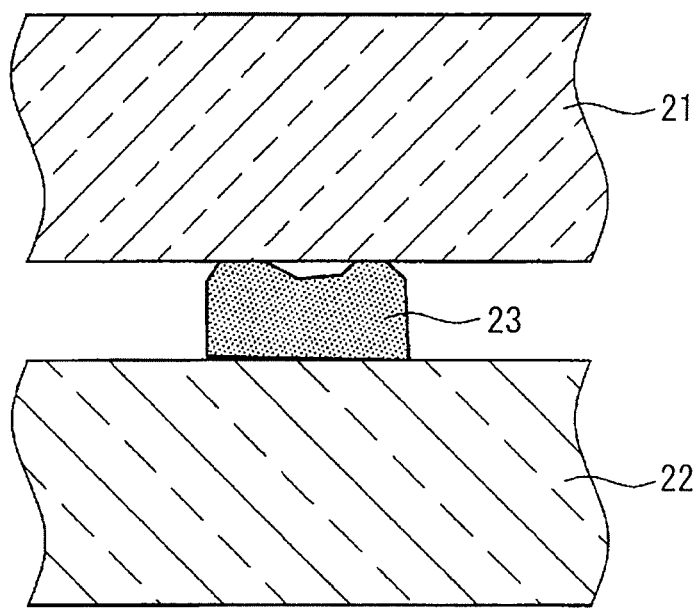
FIG. 6 is an enlarged view illustrating a shape of a spacer of the multiple pane of Embodiment 3.

FIG. 5A is a top view of the multiple pane of the present embodiment, and FIG. 5B is a cross section of the multiple pane of the present embodiment. FIG. 5B shows a cross sectional configuration taken along the line C-C' of FIG. 5A. FIG. 6 is an enlarged view illustrating a configuration of primary parts where the spacer is provided in FIG. 5B.

As shown in FIGS. 5A and 5B, the multiple pane includes a pair of glass panels 21 and 22 separated at a distance from each other by a plurality of spacers 23 which are porous members, and a seal 24, which is a hermetic bond, to hermetically bond peripheries of the pair of glass panels 21 and 22 to each other. Air in a space enclosed by the pair of glass panels 21 and 22 and the seal 24 is exhausted via an outlet (not shown) formed in the glass panel 21 in order to reduce a pressure of the space to a predetermined pressure, and then the outlet is sealed with a metal cap 25, for example. Accordingly, the space becomes a space in the reduced pressure state.

The glass panel 21 and the glass panel 22 are both formed of a sheet of float glass with a thickness of 3 mm, for example. The glass panel 21 has a hole for exhausting, which is the outlet and not shown in the drawings.

The spacers 23 are arranged on the glass panel 22 at a pitch of 2 cm, for example. Each of the spacers 23 has a circular prismatic shape with a diameter of 0.4 mm and a height of 0.1 mm, and is made of porous glass. With regard to each of the spacer 23 of the multiple pane of the present embodiment, as shown in FIG. 5, a cross-sectional shape of the spacer 23 is such a U-shape that a center of a surface of the spacer 23 in contact with the facing glass panel 21 is set back.

The seal 24 is composed of low melting glass frit, for example, and formed by applying the low melting glass frit, with a dispenser for example, onto the periphery of the glass panel 22 on which the spacers have been formed, and then drying low melting glass frit. The low melting glass frit may be: a bismuth-based seal containing 70% or more $Bi_2O_3$, 15% or less $B_2O_3$, 15% or less ZnO, and 5% or more mixture of organic substances such as ethyl cellulose and terpineol; or a frit paste.

A method of preparing the multiple pane of the present embodiment will be described.

First, the spacers 23 are formed on the glass panel 22 by photolithography. In the method of preparing the multiple pane of the present embodiment, the active light source and exposure conditions for forming the spacers 23 are adjusted so that the central region of the top face of the spacer is recessed and thus the cross-sectional shape of the spacer is the U-shape as shown in FIG. 6. Note that the spacer 23 whose the cross-sectional shape is the U-shape so that the recess is formed in the top face as shown in FIG. 6 can be formed by adjusting the sintering temperature in forming the spacer 23 to a relatively low temperature in a range of 520° C. to 610° C., for example.

Thereafter, the seal 24 is applied onto the periphery of the glass panel 23 with a dispenser for example, and then is dried. Next, the glass panel 21 and the glass panel 22 are introduced into a furnace with being arranged to face each other, and heated to melt the low melting glass frit to bond the peripheries of the glass panels 21 and 22 with the seal 24. Thereafter, air in a space inside the multiple pane in which the glass panel 21 and the glass panel 22 are bonded is exhausted via an outlet (not shown) with a rotary pump, for example, and thereafter the outlet is sealed by hermetically bonding the metal cap 25 thereto.

As described above, in the multiple pane of the present embodiment, the face of each spacer 23 in contact with the facing glass panel 21 is formed into an U-shape, and therefore in joining the pair of glass panels 21 and 22 with the seal 24 with the pair being arranged to be in contact with each other, an end of the spacer 23 is changed in shape to be fitted on the face of the glass panel 21 that defines the internal face of the multiple pane. Hence, the spacers 23 formed on the glass panel 22 can compensate for slight variations between the heights of the spacers 23 and deformation of the glass panels 21 and 22.

Figure 7:
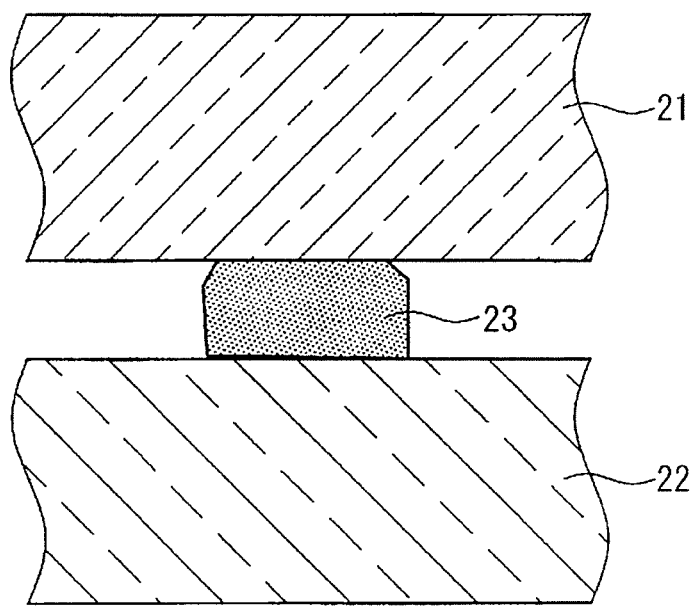
FIG. 7 is an enlarged view illustrating another shape of a spacer of the multiple pane of Embodiment 3.

Besides, as shown in FIG. 7, also in a case where the face of each spacer 23 in contact with the facing glass panel 21, which is the top face of the spacer, is formed into a projecting shape in which the center of the top face projects, the spacers 23 can compensate for slight variations between the heights of the spacers 23 and deformation of the glass panels 21 and 22, similarly to the case where the contact face with the glass panel 21 is formed into the recessed shape. The spacers having the top face with the projecting shape as shown in FIG. 7, can be realized by adjusting the active light source and the exposure conditions in forming the spacers as described above. The spacers 23 having the cross section in which the top face is formed into the projecting shape as shown in FIG. 7 may be formed by adjusting the sintering temperature in forming the spacers 23 to a temperature relatively as high as 610° C. to 630° C., for example.

Embodiment 4

A multiple pane of the Embodiment 4 according to the present disclosure will be described below using FIGS. 8A to 9.

Figure 8A:
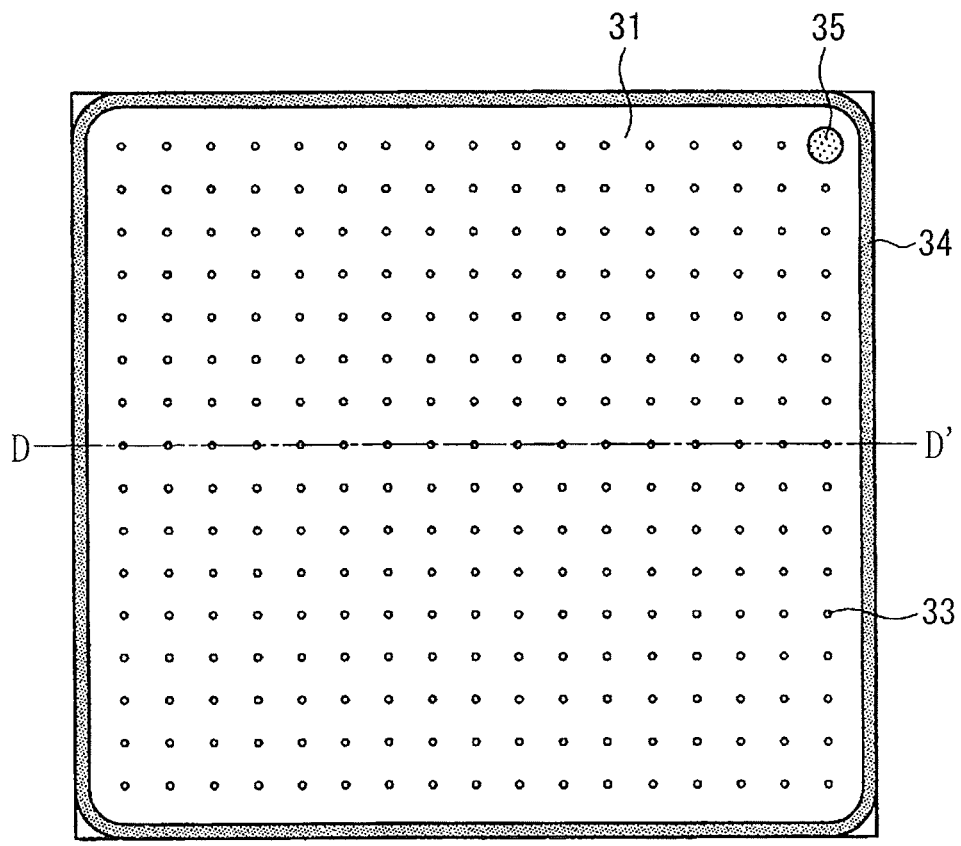
FIGS. 8A and 8B are a top view and a cross section illustrating a configuration of the multiple pane of Embodiment 4, respectively.
Figure 8B:
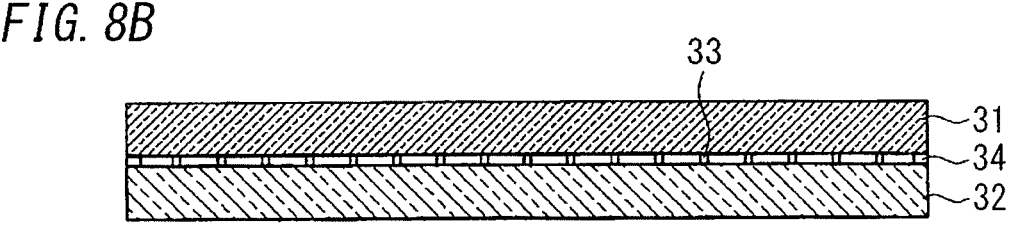
Figure 9:
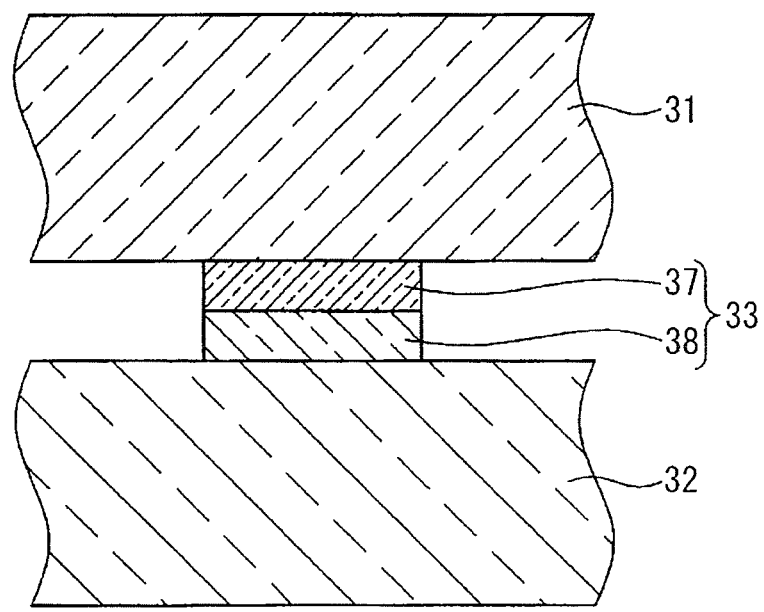
FIG. 9 is an enlarged view illustrating a configuration of a spacer of the multiple pane of Embodiment 4.

FIG. 8A is a top view of the multiple pane of the present embodiment, and FIG. 8B is a cross section of the multiple pane of the present embodiment. FIG. 8B shows a cross sectional configuration taken along the line D-D' of FIG. 8A. FIG. 9 is an enlarged view illustrating a part where the spacer is provided in FIG. 8B.

The multiple pane as shown in FIGS. 8A and 8B includes a pair of glass panels 31 and 32 separated at a predetermined distance from each other by a plurality of spacers 33, and a seal 34, which is a hermetic bond, to hermetically bond peripheries of the pair of glass panels 31 and 32 to each other. Each of the plurality of spacers 33 is a porous glass member and includes two layers which are stacked, and the cross sectional configuration of one of the spacers 33 is shown in FIG. 9. Air inside a space enclosed by the pair of glass panels 31 and 32 and the seal 34 is exhausted via an outlet (not shown) formed in the glass panel 31 in order to reduce the pressure of the space to a predetermined pressure, and then the outlet is sealed with a metal cap 35, for example. Accordingly, the space is formed into a sealed space in the reduced pressure state.

The glass panel 31 and the glass panel 32 are both formed of a sheet of float glass with a thickness of 3 mm, for example. The glass panel 31 has a hole for exhausting.

The spacers 33 are arranged on the glass panel 32 at a pitch of 2 cm, for example. Each of the spacers 33 has a circular prismatic shape with a diameter of 0.4 mm and a height of 0.2 mm, and is made of porous glass. Each of the spacers 33 has a two layer configuration in which an upper spacer layer 37 and a lower spacer layer 38 are stacked as shown in FIG. 9. The lower spacer layer 38 is composed of inorganic microparticles of silicon dioxide or the like and low melting glass microparticles e.g., bismuth zinc-based microparticles, and the upper spacer layer 37 is formed on the lower spacer layer 38. The upper spacer layer 37 is preferably made of a material having a softening temperature lower than the softening temperature of the low melting glass contained in the material for the lower spacer layer 38. For example, when the softening temperature of the low melting glass contained in the material for the lower spacer layer 38 is 510° C., the softening temperature of the material for the upper spacer layer 37 is 480° C.

The seal 34 is made of low melting glass frit, for example, and the low melting glass frit is applied, with a dispenser for example, onto a periphery of the glass panel 32 on which the spacers 33 have been formed, and then dried. Thereafter, the glass panel 32 and the glass panel 31 are introduced into a funeral with being arranged so as to face each other, and then heated to melt the low melting glass frit to join and seal them. At the time, the low melting glass contained in the upper spacer layer 37 is melt and then set. Therefore, close contact is made between the glass panel 31 and the spacers 37.

A method of preparing the multiple pane of the present embodiment will be described below.

First, the lower spacer layers 38 are formed on the glass panel 32 by photolithography. In this regard, the lower spacer layers 38 are subjected to the steps of application and drying of the photosensitive paste and exposure in a manufacturing process using photolithography. Then, a photosensitive paste for the upper spacer layer 37 is applied onto the photosensitive paste for the lower spacer layer 38 yet to be developed, then dried, and subjected to exposure. After the exposure, the photosensitive pastes for the upper spacer layer 37 and for the lower spacer layer 38 are developed at one time, and then sintered. Consequently, the spacers 33 with the two layer configuration are formed.

Thereafter, the seal 34 is applied onto the periphery of the glass panel 32 with a dispenser for example, and then is dried. Next, the glass panel 31 and the glass panel 32 are introduced into a furnace with being arranged to face each other, and heated to melt the low melting glass frit to bond the peripheries of the glass panels 1 and 2 with the seal 34. Thereafter, air in a space inside the multiple pane in which the glass panel 31 and the glass panel 32 are bonded is exhausted via an outlet (not shown) with a rotary pump, for example, and thereafter the outlet is sealed by bonding the metal cap 35 thereto to form a space whose pressure is reduced.

As described above, since the multiple pane of the present embodiment includes the spacers with the two layer configuration, adhesion between the glass panel 31 and the spacers 33 is improved, and consequently, overall strength of the multiple pane is improved.

Besides, in the multiple pane as described in the present embodiment, when the upper spacer layer 37 contains a heat shielding material such as hollow silica, heat transfer between the pair of glass panels is reduced. Hence, heat insulating properties of the multiple pane can be improved.

Besides, the spacers necessarily do not have the configuration where two layers are stacked, and may have a configuration where three or more layers are stacked. When the spacers have the configuration where three or more layers are stacked, in order to improve strength of the multiple pane by increasing adhesion of the spacers to the facing glass panel, the uppermost layer spacer is preferably made of a material having a low softening temperature. In addition, also in the case where the spacers contain the material with high heat shielding properties such as hollow silica, and have a layered formation, the uppermost layer of the spacer is preferably made of a material with the highest heat shielding properties.

Note that, in the case of forming the layers of the spacer having the two layer configuration both by photolithography, the spacer is necessarily not formed in the aforementioned manner. For example, the photosensitive paste for the upper spacer layer 37 may be applied, after development and sintering of the lower spacer layer 38. Otherwise, the lower spacer layer 38 is formed by photolithography, and then the upper spacer layer 37 may be formed by screen printing or other printing.

Other Embodiments

As described above, the multiple panes according to the present disclosure are specifically described using Embodiments 1 to 4 as examples of the multiple pane. However, the multiple panes according to the present disclosure are not limited to these embodiments, and may include embodiments modified by appropriate changes, substitutions, addition, and omission. Besides, the multiple panes according to the present disclosure may include new embodiments obtained by combining components described in Embodiments 1 to 4.

Incidentally, other embodiments than Embodiments 1 to 4 will be described collectively.

In the aforementioned embodiments, described is the step of forming the sealed space in the reduced pressure state by joining the pair of glass panels with the seal and subsequently exhausting the air in the space inside the multiple pane. However, this step may be substituted by a step of joining the pair of glass panels by melting the seal in parallel with exhausting the air in the space inside the multiple pane.

In the aforementioned embodiments, the air in the space inside the multiple pane is exhausted and subsequently the outlet is bonded to the metal cap to be sealed, for example. However, an outlet tube which is a glass tube may be attached to the outlet, the air in the space inside the multiple pane may be exhausted via the outlet tube, and thereafter the outlet tube may be cut by melting the outlet tube to seal the space.

In the aforementioned embodiments, the glass panel composing the multiple pane is formed of float glass, for example. However, the glass panel may be not only made of float glass but also be a glass panel made of soda-lime glass, high-strain glass, chemically toughened glass, physically toughened glass, non-alkali glass, quartz glass, Neoceram, borosilicate glass, or Tempax.

In the aforementioned embodiments, the pair of glass panels have the same outer shape and the same thickness (3 mm, for example), for example. However, it is not intended to prevent that dimensions and/or the thickness of one glass panel are different from those of the other glass panel. Besides, the dimensions of the glass panel may vary depending on the application, and include a length of one side several cm, at smallest, or a length of one side about 2 to 3 m, at maximum for use of a window glass. The thickness of the glass panel may vary depending on the application, and may be about 2 to 3 mm at smallest, or may be about 20 mm at greatest.

In the aforementioned embodiments, the spacer is described as a spacer with such an approximately circular prismatic shape that a horizontal sectional shape of the spacer is circular, for example. However, the shape of the spacer is not limited to the circular prismatic shape described above, but may be selected from various shapes such as a prismatic shape having a horizontal sectional shape in the face direction of the glass panel being rectangular, triangular, or polygonal.

Besides, the dimensions of the spacer are not limited to those described above, and are selected appropriately in accordance with the size and the thickness of the glass panel used, the interval between the glass panels, and the like.

An arrangement pattern, an arrangement pitch, a size distribution on the glass panel of the spacers are appropriately selected.

Figure 10A:
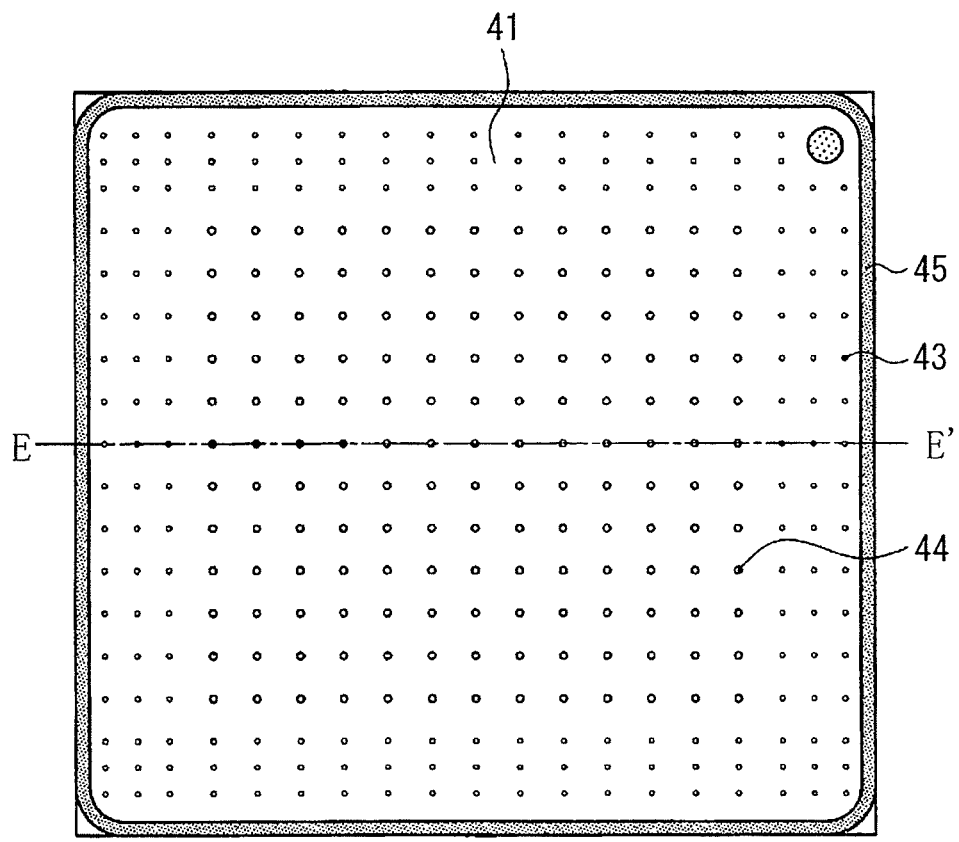
FIGS. 10A and 10B are a top view and a cross section illustrating a configuration of the multiple pane including spacers arranged in different patterns, respectively.
Figure 10B:
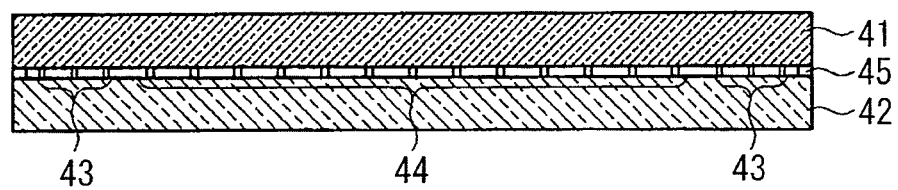

FIGS. 10A and 10B show the first example of the multiple pane having variations both in the arrangement pitch of the spacers on the glass panel and in the size distribution of the spacers, the size referring the dimensions of the spacer in the face direction of the glass panel. FIG. 10A is a top view of the first example of the multiple pane, and FIG. 10B shows a cross sectional configuration of the first example of the multiple pane. FIG. 10B also shows a cross sectional configuration taken along the line E-E' of FIG. 10A.

As shown in FIGS. 10A and 10B, in the first example of the multiple pane having variations in the arrangement pitch and the size distribution of the spacers on the glass panel, the spacers between the pair of glass panels 41 and 42 include spacers 43 at a peripheral region and spacers 44 at a central region. The spacers 43 at the peripheral region have a smaller size than that of the spacers 44 at the central region. Besides, the spacers 43 at the peripheral region are arranged at a narrower arrangement pitch than that for the spacers 44 at the central region. Specifically, the arrangement pitch for the spacers 43 at the peripheral region is 1.5 cm and the arrangement pitch for the spacers 44 at the central region is 2.0 cm, for example. Besides, the diameter of the spacers 43 at the peripheral region is 0.3 mm while the diameter of the spacers 44 at the central region is 0.5 mm. Owing to variations in the arrangement pitch and the size of the spacers formed on the glass panel 42 as described above, when an external force is applied on the periphery of the multiple pane, more spacers can receive the external force and distribute it. Hence, it is possible to effectively prevent breakage of the multiple pane and peeling of the seal 45.

Figure 11A:
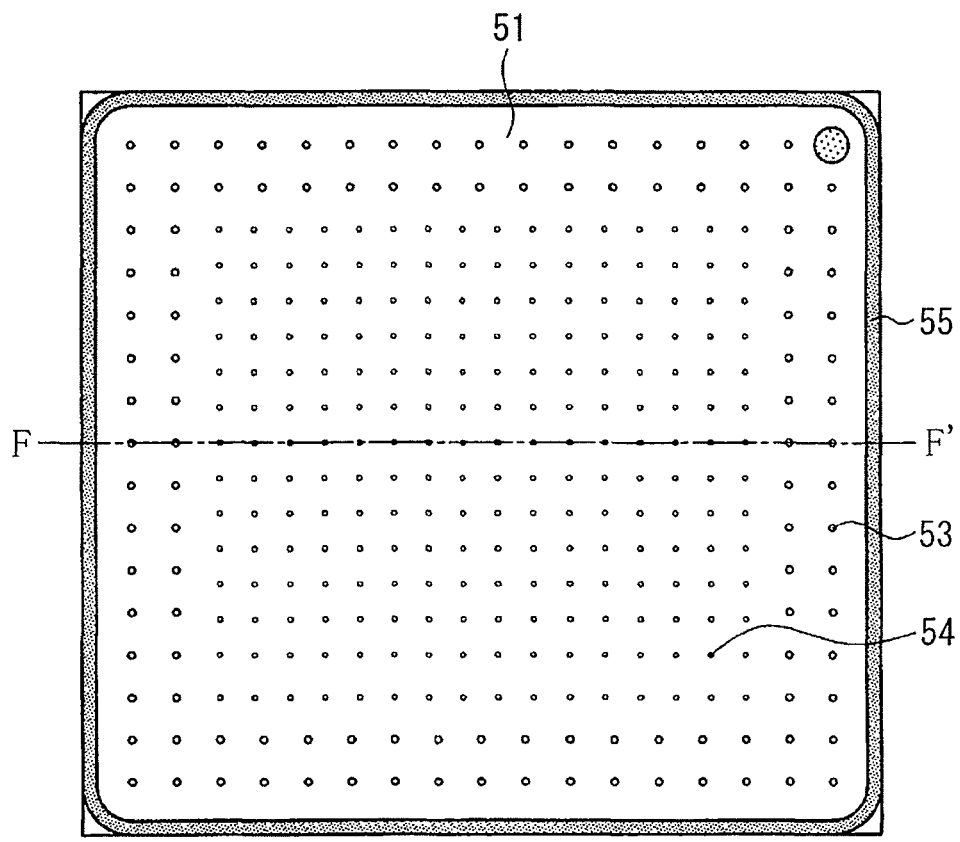
FIGS. 11A and 11B are a top view and a cross section illustrating a configuration of a multiple pane including spacers arranged in other different patterns, respectively.
Figure 11B:
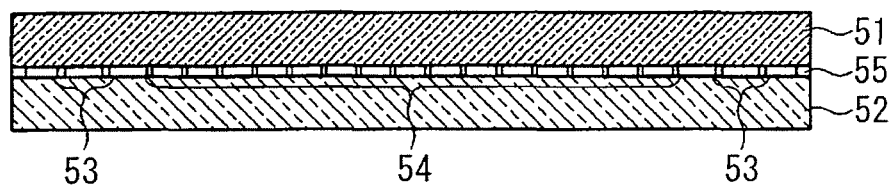

FIGS. 11A and 11B show the second example of the multiple pane having variations both in the arrangement pitch of the spacers on the glass panel and in the size distribution of the spacers, the size referring the dimensions of the spacers in the face direction of the glass panel. FIG. 11A is a top view of the second example of the multiple pane, and FIG. 11B shows a cross sectional configuration of the second example of the multiple pane. FIG. 11B also shows a cross sectional configuration taken along the line F-F' of FIG. 11A.

As shown in FIGS. 11A and 11B, in the second example of the multiple pane having variations in the arrangement pitch and the size distribution of the spacers on the glass panel, the spacers include spacers 53 at a peripheral region and spacers 54 at a central region. The spacers 53 at the peripheral region have a greater size than that of the spacers 54 at the central region. Besides, the spacers 53 at the peripheral region are arranged at a wider arrangement pitch than that for the spacer 54 at the central region. Specifically, the arrangement pitch for the spacers 53 at the peripheral region is 2.0 cm, and the arrangement pitch for the spacers 54 at the central region is 1.5 cm, for example. Besides, the diameter of the spacers 53 at the peripheral region is 0.5 mm, and the diameter of the spacers 54 at the central region is 0.3 mm. Owing to variations in the arrangement pitch and the size of the spacers formed on the glass panel 52 as described above, when the multiple pane is used as a window pane, for example, the spacers near the seal are small and therefore are less likely to be visually perceived. Hence, a multiple pane excellent in appearance can be obtained. Furthermore, an interval between the spacers 53 which are at the central region and far from the seal is smaller, and the spacers 53 have a smaller diameter in a horizontal direction. Therefore, it is possible to realize the multiple pane which includes the spacers less likely to be visually perceived and nevertheless is capable of suppressing a change in the shape of the multiple pane caused by flexure of the glass panels.

Note that in the examples of the multiple pane shown in FIGS. 10A and 10B and the multiple pane shown in FIGS. 11A and 11B, the variations in the arrangement pitch and the size of the spacers depend on a position of the spacer on the glass panel, and a region on the glass panel is classified into two regions of the peripheral region and the central region, and, in each of the peripheral region and the central region, the size and the arrangement pitch for the spacers are constant. However, the multiple pane according to the present disclosure may include three or more regions of which the arrangement pitches and the sizes of the spacers are different from each other. Furthermore, in each of the regions, the arrangement pitch and/or the size of the spacers may vary in a stepwise manner. Besides, instead of dividing the glass panel into such regions, the pitch and/or the size of the spacers may vary in a stepwise manner from one edge to another edge, for example.

Besides, by making use of the fact that the spacers used in the multiple pane of the present disclosure are formed by the photolithography, by adjusting the pattern of the exposure mask, the spacers can be arranged on the glass panel of the multiple pane to show a pattern that is perceived by a user as being meaningful.

The pattern that is represented by the arrangement of the spacers and is perceived as being meaningful may include various words such as the product name of the multiple pane. Furthermore, the various words may include a name and a telephone number of a shop, when the multiple pane is used for a show window of the shop. Similarly, such a pattern may include logos of the multiple pane per se and/or a manufacturer of the multiple pane. Furthermore, when the multiple pane is used as a window pane of a shop or a facility or when the multiple pane is used as a window of an information research system box for a public internet terminal or the like, such a pattern may include figures and/or symbols recognized as a meaningful mark providing various meanings e.g., a mark symbolizing services the facility can provide.

Figure 12A:
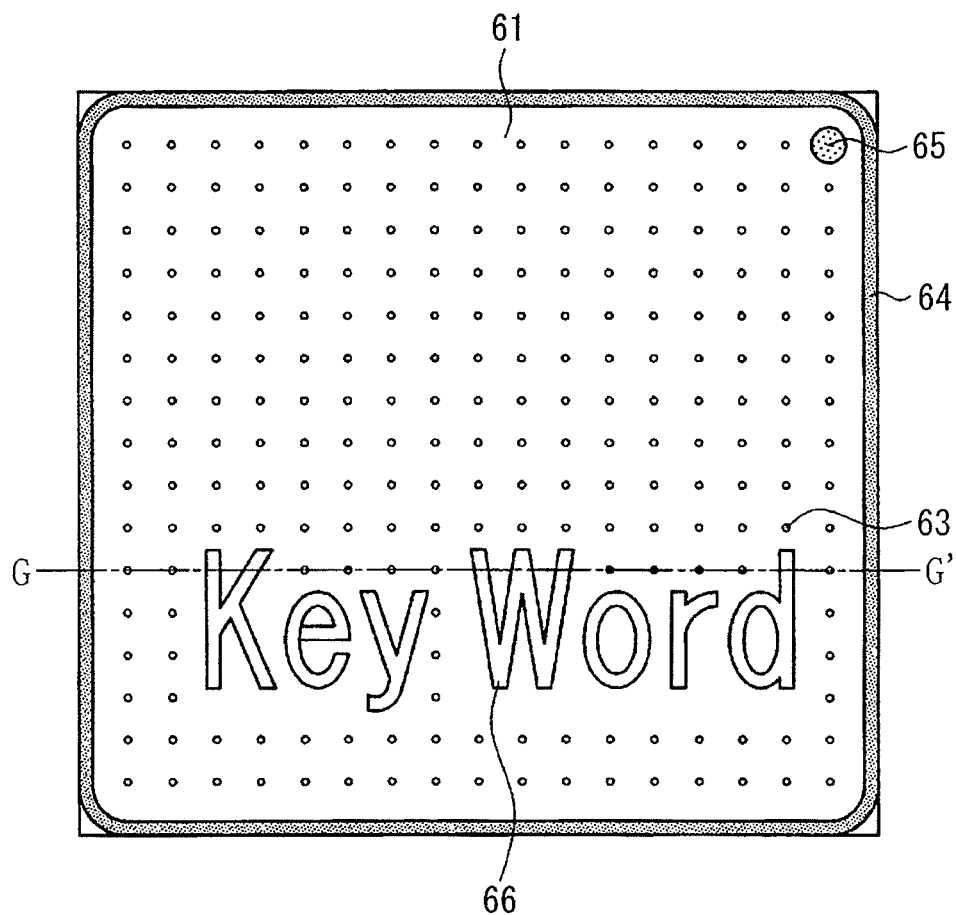
FIGS. 12A and 12B are a top view and a cross section illustrating a configuration of the multiple pane having a visible and meaningful pattern represented by spacers, respectively.
Figure 12B:
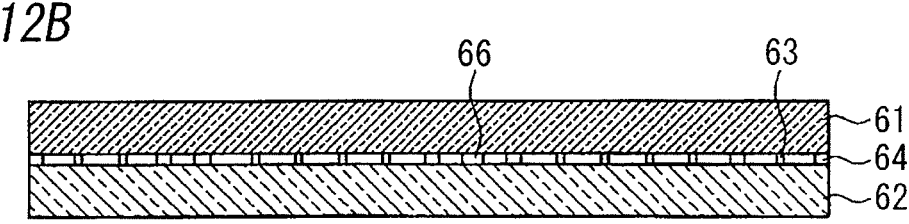

FIGS. 12A and 12B show a configuration example of a multiple pane having a visible and meaningful pattern represented by the spacers. FIG. 12A is a top view of the present configuration example of the multiple pane, and FIG. 12B shows a cross sectional configuration of the present configuration example of the multiple pane. FIG. 12B also shows a cross sectional configuration taken along the line G-G' of FIG. 12A.

As shown in FIGS. 12A and 12B, in the configuration example of the multiple pane, some of the spacers 63 between the pair of glass panels 61 and 62 form a letter pattern 66 which can be read as "Key Word". The letter pattern 66 is formed by use of photolithography that is performed in forming the other spacers 63. For formation of the letter pattern 66, the photosensitive paste applied for forming the spacers 63 is exposed so as to leave the letter pattern 66 showing "Key Word" with an exposure mask. Note that the present configuration example shown in FIGS. 12A and 12B may be the same as the multiple pane which is described as the first embodiment of the present disclosure and shown in FIGS. 1A and 1B in the materials and the thickness of the glass panels 61 and 62, a forming method, a sealing method, a metal cap 65 to enclose the outlet, except that the present configuration example includes the spacers representing the letter pattern 66. Therefore, detail description thereof will be omitted.

In the configuration example shown in FIGS. 12A and 12B, the spacers representing the letter pattern 66 have the exact shapes of individual letters of "Key words". However, the spacers of the multiple pane according to the present disclosure are formed by photolithography. Therefore, in some cases, shapes of top faces of the spacers may not be sufficiently strictly controlled due to limitations such as materials for spacers, manufacturing conditions, and height of spacers on the glass panel. Besides, when a letter has a hole like an "e", "o", or "d", it may be difficult to form such a letter in an intended shape. In these cases, instead of use of a spacer with the same shape as an intended letter or a spacer with a top face having the same shape as an intended figure as shown in FIG. 12A, it may be possible to use a group of spacers that forms as a whole an intended letter or figure by adjusting intervals of the spacers and shapes or sizes of horizontal sections of the spacers based on the same principle as a group of dots forms a letter or figure.

The method of preparing the visible and meaningful pattern represented by spacers includes the method of forming spacers having shapes of specific letters and figures as described using FIGS. 12A and 12B. Besides, the method of preparing the visible and meaningful pattern represented by the spacers includes a method using the technique of varying the arrangement pitch and size of the spacers in an entire region over the glass panel constituting the multiple pane as described above using FIGS. 10A to 11B, it is possible to form gradation of light and shade on an entire surface of the glass panel and/or form a pattern such as a check pattern and a zigzag pattern.

Furthermore, by varying color, reflectivity, and luster of a material for constituting at least part of the spacer depending on a formation region, the meaningful pattern defined by the spacers may be formed as a colored pattern. As such a method of varying the color of the spacers, a method of applying a photosensitive paste with desired colors on individual parts of the glass panel is effective. Besides, when the spacers with the two layer configuration are used like Embodiment 4 described using FIG. 9 and the like, the upper spacer layer is formed by printing, for example, it is remarkably facilitated to form spacers with a desired color in a desired region.

In each of the multiple panes of embodiments according to the present disclosure, all glass panels are in a flat plate shape. However, the multiple pane according to the present disclosure may include a glass panel (e.g., a glass panel curved in one direction) other than a glass panel in a flat plate shape.

Figure 13A:
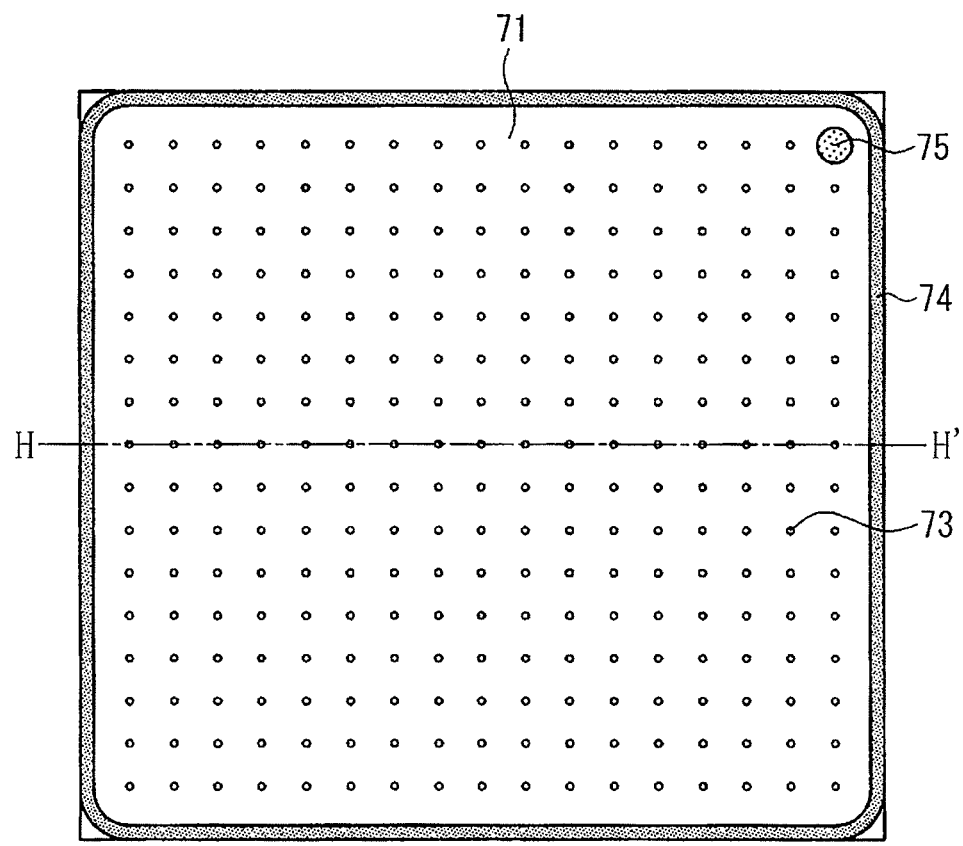
FIGS. 13A and 13B are a top view and a cross section illustrating a configuration of the multiple pane including curved glass panels, respectively.
Figure 13B:
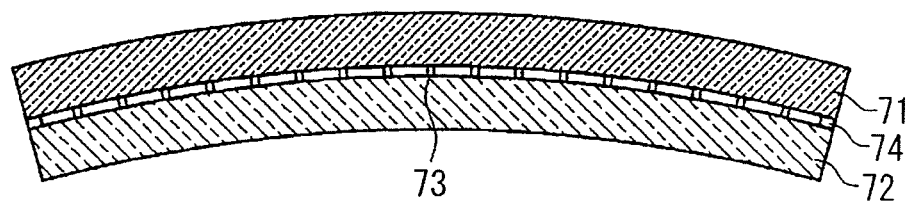

FIGS. 13A and 13B show a configuration example of a multiple pane including a pair of glass panels curved in one direction. FIG. 13A is a top view of the multiple pane including curved glass panels, and FIG. 13B is a cross section thereof. FIG. 13B shows a cross sectional configuration taken along the line H-H' of FIG. 13A.

As shown in FIGS. 13A and 13B, the present configuration of the multiple pane includes glass panels both curved in one direction, namely, a left and right direction in figures, as a pair of glass panels 71 and 72. Note that, in the present configuration example shown in FIGS. 13A and 13B, the glass panels 71 and the glass panel 72 are curved at the same degree, and the multiple pane includes the pair of glass panels 71 and 72 separated at a predetermined distance from each other by a plurality of spacers 73, and a seal 74, which is a hermetic bond, to hermetically bond peripheries of the pair of glass panels 71 and 72 to each other. Each of the spacers 73 is a porous member. Air inside a space enclosed by the pair of glass panels 71 and 72 and the seal 74 is exhausted via an outlet (not shown) formed in the glass panel 71 in order to reduce the pressure of the space to a predetermined pressure, and then the outlet is sealed with a metal cap 75, for example. Accordingly, the space is formed into a space in the reduced pressure state.

Note that the present configuration example shown in FIGS. 13A and 13B is the same as the multiple pane which is described as the first embodiment of the present disclosure and shown in FIGS. 1A and 1B in the materials and the thickness of the glass panels 71 and 72, a forming method, a sealing method, and the like, except that the glass panels 71 and 72 are curved in one direction. Therefore, detailed description of this example is omitted.

In the multiple pane according to the present disclosure, the spacers 73 are formed by applying a paste which is a mixture of the material composing the spacers and a binder onto a glass panel by screen printing, bar-coating, roll-coating, or the like, and then performing photolithography using a photo mask. Therefore, even when the glass panel is curved, using a photo mask in the film shape or the like leads to successful formation of spacers having predetermined shape and size at predetermined position. Therefore, compared with background arts using spacers of metal balls in which it is difficult to place the spacers at certain positions on the glass panel, the multiple pane including the curved glass panels can be easily prepared.

In configuration example of FIGS. 13A and 13B, the pair of glass panels 71 and 72 are both curved in one direction. However, the multiple pane according to the present disclosure includes a multiple pane using curved glass panels having strength which is not less than a predetermined value even in a state where the inside of the multiple pane has a reduced pressure. Examples of the curved glass panel include: a glass panel which is curved in all directions like a shape of parts of a sphere; and a glass panel with a wave-like shape having some units with asperity. Besides, the pair of glass panels need not have the completely same curvature degree. In the multiple pane, a distance between two glass panels may vary according to positions, within a range in which the spacers with a desired height can be formed.

These multiple panes using the curved glass panels are curved as a whole, and therefore exhibit high designability when used in a window and has high usefulness because they are available in cases where it is not possible to use a planar multiple pane in view of constraints on shapes for members to be fitted.

Then, a configuration example of the multiple pane made with particular consideration for design of appearance is described.

Figure 14A:
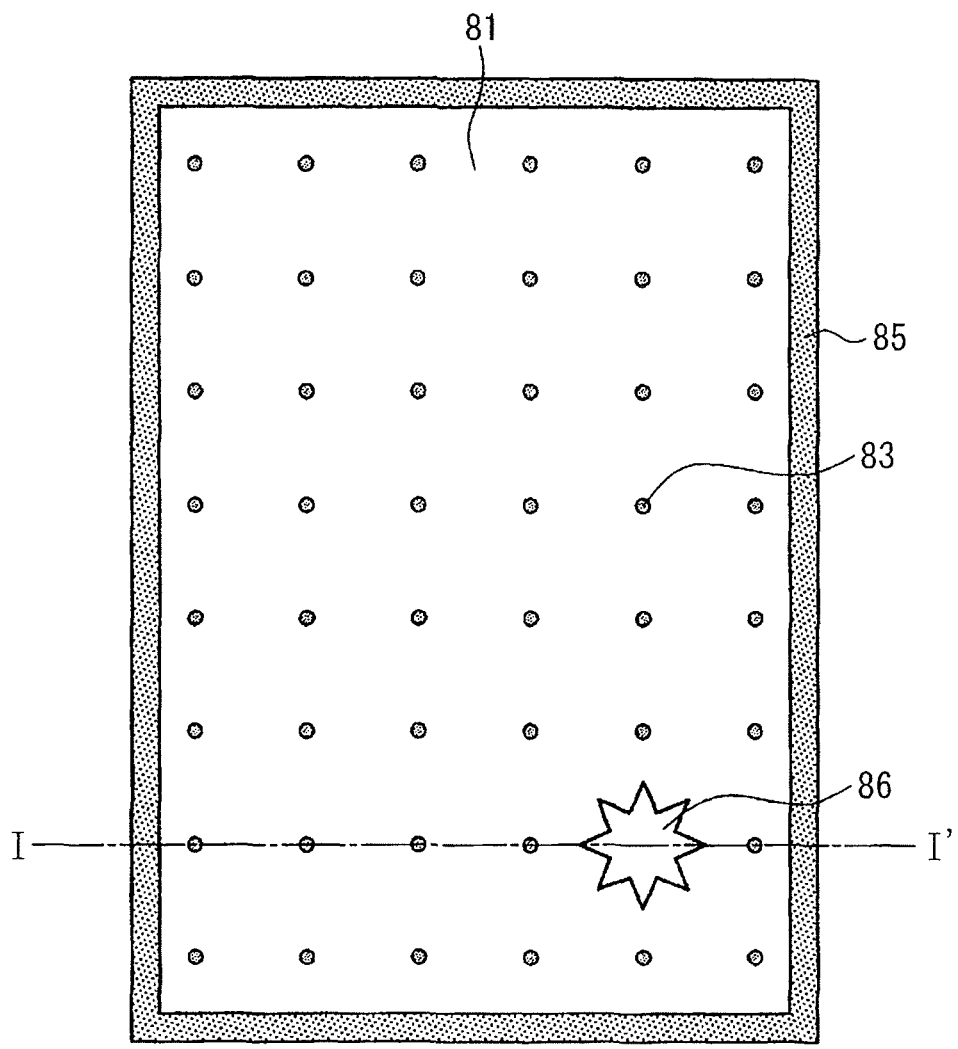
FIGS. 14A and 14B are a top view and a cross section illustrating a configuration of the multiple pane made in view of design of appearance, respectively.
Figure 14B:
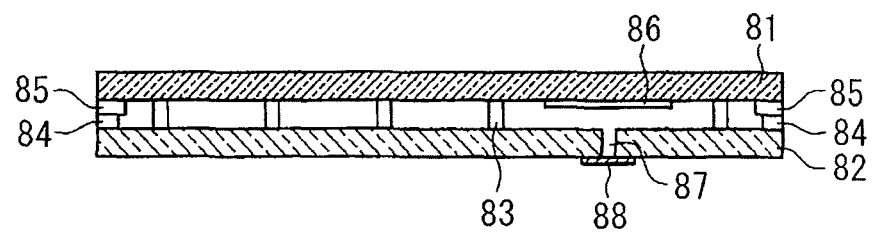

FIGS. 14A and 14B show a configuration example of a multiple pane that has a predetermined printed pattern film on the glass panel in view of design for appearance. FIG. 14A is a top view of the multiple pane having the printed pattern film on the glass panel, and FIG. 14B is a cross section thereof. FIG. 14B shows a cross sectional configuration taken along the line FT of FIG. 14A.

As shown in FIGS. 14A and 14B, the present configuration of the multiple pane includes the pair of glass panels 81 and 82 separated at a predetermined distance from each other by a plurality of spacers 83, and a seal 84, which is a hermetic bond, to hermetically bond peripheries of the pair of glass panels 81 and 82 to each other. Each of the spacers 83 is a porous member. Air inside a space enclosed by the pair of glass panels 81 and 82 and the seal 84 is exhausted via an outlet 87 formed in the glass panel 81 in order to reduce the pressure of the space to a predetermined pressure, and then the outlet 87 is sealed with a metal cap 88, for example. Accordingly, the space is formed into a space in the reduced pressure state.

The present configuration example shown in FIGS. 14A and 14B includes a first printed patterned film 85 on a region of a surface of the glass panel 81. The surface faces the glass panel 82 and is inside the multiple pane. The region overlaps a region where the seal 84 is provided. Besides, a second printed patterned film 86 is formed on a further region of the surface of the glass panel 81. The further region faces a part of the second glass panel 82, the outlet 87 being formed on the part.

In the multiple pane according to the present disclosure, the seal 84 to hermetically bond the pair of glass panels 81 and 82 is formed by applying a low-melting glass material such as glass frit onto a periphery of a glass panel with a dispenser or the like, and once melting the low-melting glass material to hermetically bond the glass panels. Therefore, due to inevitable factors such as variations in application width and a force applied on the seal 84 by the glass panels 81 and 82, the seal 84 of the multiple pane after hermetically bonding, may not have an outer shape with straight lines. Therefore, it is difficult to form the seal 84 with good appearance. In view of this, as shown in the cross-sectional configuration of FIG. 14B, it is possible to improve appearance of the multiple pane by forming the first printed patterned film 85 having a width greater than a formation width of the seal 84 on the periphery of the glass panel 81 so that the seal 84 cannot be directly seen.

Besides, as shown in FIGS. 14A and 14B, for example, the second printed patterned film 86 with a design is formed at a position overlapping a portion, in which the outlet 87 is formed, of the glass substrate 82. Consequently, the pressure reducer (the outlet 87 and the metal cap 88 for sealing the outlet 87) for allowing the space to be sealed to be in the reduced pressure state is covered, and thus the pressure reducer can be concealed. As described above, the first printed patterned film 85 and the second printed patterned film 86 are formed on the glass panel 81. Therefore, when the multiple pane is used in window glass, a user recognizes that the window glass has a pattern as a design, and may not perceive the seal 84 and the pressure reducer such as the outlet 87 and the metal cap 88 which cause bad appearance.

Note that as shown in FIG. 14A, when the second printed patterned film 86 with a design is formed on a center portion of the multiple pane, the pressure reducer such as the outlet 87 and the metal cap 88 is at a position overlapping the second printed patterned film 86 and thus can be positioned close to the center of the sealed space to be formed in the multiple pane. For example, in the multiple pane described in the first embodiment shown in FIGS. 1A and 1B, the outlet not shown in FIGS. 1A and 1B and the metal cap 5 are often formed at a corner of the sealed space so as to make it difficult for a user to perceive them. However, when the outlet is on the periphery of the sealed space, inconvenience relating to production of the multiple pane such as an increase in exhaust resistance may occur. In contrast to this, in the present configuration, the outlet can be positioned close to the center of the sealed space, and therefore the exhaust resistance can be decreased.

In the multiple pane shown in FIGS. 14A and 14B, the materials for the glass panels 81 and 82, the spacers 83, the seal 84, and the like and the method of preparing the multiple pane are the same as those in the multiple pane shown in FIGS. 1A and 1B as the first embodiment. Therefore, detail description is omitted. Besides, in the multiple pane of which the configuration is shown in FIGS. 14A and 14B, the first printed patterned film 85 and the second printed patterned film 86 are formed on the surface of the glass panel 81 on which the spacers 83 are not to be formed and inside the multiple pane, for example. However, the glass panel on which the printed patterned film is provided may be the glass panel 82 on which the spacers 83 are to be formed. Besides, printed patterned films may be provided on the surfaces of the glass panel 81 and the glass panel 82 outside the multiple pane.

Besides, in the multiple pane shown in FIGS. 14A and 14B the first printed patterned film 85 hides the seal 84, and the second printed patterned film 86 hides the outlet 87 and the metal cap 88, for example. However, only either one of these two printed patterned films may be formed. In addition, when a getter is provided in the sealed space to be formed between the pair of glass panels, the second printed patterned film 86 may be provided at a position overlapping the getter. The getter is one example of the pressure reducer to improve the degree of vacuum or to prevent generation of gas in order to suppress a drop in transparency of the multiple pane. Besides, when the getter is provided, a third printed pattern film may be formed in addition to the first printed pattern film and the second printed pattern film so that the third printed pattern film covers the getter. Also when the getter is provided in the sealed space, in order to obtain the effect inherent to the getter, the getter is preferably provided as close to the center of the sealed space as possible as with in the case of the outlet. Therefore, providing the printed pattern film on the glass panel as described in the present configuration example enables positioning the getter closer to the center of the sealed space. Therefore, it is possible to more enhance the effect of the getter.

Note that the infrared reflective film as formed in the multiple pane of Embodiment 2 described using FIGS. 2A to 4B may be included in the configurations of the multiple panes of Embodiment 3, Embodiment 4, and the other embodiment having various variations. By being configured to include the infrared reflective film, the multiple panes can show improved heat insulating effect in addition to the individual features of configurations of the individual embodiment.

Besides, in the multiple pane according to the present disclosure, when the seal is made of a sealant which melts at a relatively low temperature e.g., 300° C., the material to compose the spacers may be a resin material. For example, the porous material may be formed of by adding an inorganic material such as silicon dioxide, titanium dioxide, crystallized or amorphous glass fine powder, and hollow silica, into the resin material instead of a low melting glass material.

Besides, already established techniques related to the multiple pane may be appropriately added to and applied in the multiple pane according to the present disclosure. The already established technique includes a formation of an organic or inorganic film in order to impart, to the glass panel, various optical properties of antireflection and/or absorbing ultraviolet rays, or functions of heat insulating characteristics and the like.

Furthermore, by using the multiple pane per se as at least one glass panel of the pair of glass panel, a multiple pane may be composed of three or more glass panels in total which are stacked and separated by a predetermined space individually. In this case, the multiple pane according to the present disclosure may be contained as a part in a thickness direction of a multiple pane. Therefore, the multiple pane according to the present disclosure may include various mode such as a mode where a multiple pane containing enclosed inert gas between the pair of glass panels is provided on the multiple pane according to the present disclosure, a mode where a multiple pane formed by the method according to the present disclosure or another method is further provided on the multiple pane according to the present disclosure, a mode where a multiple pane in which glass panels are simply stacked at a predetermined interval and a space therebetween still has the atmospheric pressure is provided on the multiple pane according to the present disclosure.

Note that the multiple pane according to the present disclosure is successfully used as a window pane serving as eco-glass which shows a high heat insulating effect and is easy to be handled. Besides, application for household use or business use is expected because the multiple pane provided in a refrigerator or a freezer does not interfere with functions of the refrigerator or the freezer and allows an inner condition to be confirmed.

As described above, the applicant provides an embodiment that the applicant considers as the best mode, and other embodiments using the attached drawings and/or the detailed description. These are provided for the purpose of exemplifying the subject matters of claims for persons skilled in the art by reference to the particular embodiment. Therefore, the components shown in the drawings and described in the detailed description includes not only essential components for solving the problem but also the other components. Hence, by reason of being illustrated in the drawings and/or described in the detailed description, these non-essential components are not to be recognized immediately as being essential. Furthermore, within a range including claims and equivalents to the claims, various modification, substitution, addition, and omission may be performed regarding the aforementioned embodiment.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

A multiple pane according to the first aspect of the present disclosure includes: a pair of glass panels; and a plurality of spacers interposed between the pair of glass panels to keep a distance between the pair of panels to be constant. Peripheries of the glass panels are hermetically bonded. The multiple pane contains a space to be sealed between the glass panels, and the space is in reduced pressure state. Each of the spacers includes at least one layer of a porous member.

In the multiple pane according to the second aspect of the present disclosure referring to the first aspect, each of the spacers is porous glass.

In the multiple pane according to the third aspect of the present disclosure referring to the first or second aspect, at least one glass panel of the pair of glass panels has a film which allows visible radiation to pass therethrough but reflects infrared radiation.

In the multiple pane according to the fourth aspect of the present disclosure referring to any one of the first to third aspects, the porous member contains hollow silica.

In the multiple pane according to the fifth aspect of the present disclosure referring to any one of the first to third aspects, the porous member contains crystallized glass and filler.

In the multiple pane according to the sixth aspect of the present disclosure referring to any one of the first to third aspects, the porous member contains a metal oxide material with electrical conductivity.

In the multiple pane according to the seventh aspect of the present disclosure referring to any one of the first to third aspects, the porous member has a face in contact with the glass pane, and the face is in an U-shape or a projecting shape.

In the multiple pane according to the eighth aspect of the present disclosure referring to any one of the first to third aspects, each of the plurality of spacers is a porous member and contains two layers. A layer of the two layers is in contact with the glass panel and made of a material having adhesion to glass.

In the multiple pane according to the ninth aspect of the present disclosure referring to any one of the first to third aspects, each of the plurality of spacers is a porous member and contains two layers. A layer out of the two layers is in contact with the glass panel and made of a material having heat-barrier properties.

In the multiple pane according to the tenth aspect of the present disclosure referring to any one of the first to ninth aspects, an interval between spacers on a peripheral region of the glass panel is different from an interval between spacers on a central region of the glass panel.

In the multiple pane according to the eleventh aspect of the present disclosure referring to any one of the first to ninth aspects, a size of the spacers on a peripheral region of the glass panel is different from a size of the spacers on a central region of the glass panel.

A method of preparing a multiple pane according to the twelfth aspect of the present disclosure, includes: arranging a pair of glass panels so as to face each other and be separated from each other at a predetermined distance by a spacer; bonding peripheries of the pair of glass panels to form a space to be sealed between the glass panels; making the space be in a reduced pressure state, in which the spacer is made from a photosensitive paste and includes one or more layer of porous glass.

INDUSTRIAL APPLICABILITY

As described above, a multiple pane according to the present disclosure is highly useful, and can be used in various applications such as a window pane, a window member for looking inside a refrigerator, and the like, as a highly useful multiple pane.

The invention claimed is:

1. A multiple pane comprising:
   a pair of glass panels;
   a plurality of spacers interposed between the pair of glass panels; and
   a hermetic bond that hermetically bonds peripheries of the pair of glass panels to each other,
   the multiple pane comprising a space provided between the pair of glass panels, the space being sealed so as to be in a reduced pressure state,
   each of the plurality of spacers being a porous member,
   the plurality of spacers including spacers at a peripheral region of the pair of glass panels and spacers at a central region of the pair of glass panels, each of the plurality of spacers being spaced from the hermetic bond,
   the spacers at the peripheral region having a greater cross-sectional size, along a face direction of the pair of glass panels, than a cross-sectional size of the spacers at the central region, and
   the spacers at the peripheral region being arranged at a wider arrangement pitch than that for the spacers at the central region.

* * * * *